United States Patent
Tucholski

(10) Patent No.: US 8,574,754 B2
(45) Date of Patent: Nov. 5, 2013

(54) HIGH CURRENT THIN ELECTROCHEMICAL CELL AND METHODS OF MAKING THE SAME

(75) Inventor: Gary R. Tucholski, North Royalton, OH (US)

(73) Assignee: Blue Spark Technologies, Inc., Westlake, OH (US)

( * ) Notice: Subject to any disclaimer, the term of this patent is extended or adjusted under 35 U.S.C. 154(b) by 493 days.

(21) Appl. No.: 12/809,844

(22) PCT Filed: Dec. 18, 2008

(86) PCT No.: PCT/US2008/087424
§ 371 (c)(1), (2), (4) Date: Jun. 21, 2010

(87) PCT Pub. No.: WO2009/085950
PCT Pub. Date: Jul. 9, 2009

(65) Prior Publication Data
US 2010/0266895 A1    Oct. 21, 2010

Related U.S. Application Data

(60) Provisional application No. 61/014,826, filed on Dec. 19, 2007.

(51) Int. Cl.
*H01M 4/02* (2006.01)
*H01M 4/82* (2006.01)
*H01M 2/08* (2006.01)

(52) U.S. Cl.
USPC .......... 429/185; 429/209; 29/623.1; 29/623.4

(58) Field of Classification Search
USPC ............ 429/185, 209; 29/623.1, 623.4
See application file for complete search history.

(56) References Cited

U.S. PATENT DOCUMENTS

| | | | |
|---|---|---|---|
| 629,325 | A | 7/1899 | Ashley |
| 629,372 | A | 7/1899 | Kennedy |
| 2,154,312 | A | 4/1939 | MacCallum |
| 2,480,531 | A | 8/1949 | Wilke |
| 2,637,757 | A | 5/1953 | Wilke |

(Continued)

FOREIGN PATENT DOCUMENTS

| | | |
|---|---|---|
| DE | 19943961 A1 | 6/2000 |
| EP | 0678927 A1 | 10/1995 |

(Continued)

OTHER PUBLICATIONS

Extended European search report issued Nov. 24, 2011 in corresponding European patent application No. 08868145.

(Continued)

*Primary Examiner* — Carlos Barcena
*Assistant Examiner* — Michael Dignan
(74) *Attorney, Agent, or Firm* — Pearne & Gordon LLP

(57) ABSTRACT

A battery including at least one electrochemical cell for generating an electrical current is provided, along with its method of manufacture. In one example, the electrochemical cell is provided on a first substrate and includes an anode and a plurality of cathodes. At least a portion of said anode is located between an adjacent two of said plurality of cathodes. In one example method of manufacture, the electrochemical cell is made via a printing press process.

14 Claims, 12 Drawing Sheets

(56) References Cited

U.S. PATENT DOCUMENTS

| | | |
|---|---|---|
| 2,688,649 A | 9/1954 | Bjorksten |
| 2,903,498 A | 9/1959 | Sindel et al. |
| 2,905,738 A | 9/1959 | Di Pasquale et al. |
| 3,006,980 A | 10/1961 | Story |
| 3,230,115 A | 1/1966 | Tamminen |
| 3,375,136 A | 3/1968 | Biggar |
| 3,655,449 A | 4/1972 | Yamamoto et al. |
| 3,770,504 A | 11/1973 | Bergum |
| 3,799,808 A | 3/1974 | Hancock |
| 3,847,669 A | 11/1974 | Paterniti |
| 3,901,732 A | 8/1975 | Kalnoki Kis et al. |
| 3,928,077 A | 12/1975 | Sperandio et al. |
| 3,954,506 A | 5/1976 | Sullivan |
| 3,967,292 A | 6/1976 | Delahunt |
| 3,980,497 A | 9/1976 | Gillman et al. |
| 3,988,168 A | 10/1976 | Bruneau |
| 3,993,508 A | 11/1976 | Erlichman |
| 4,001,467 A | 1/1977 | Sullivan |
| 4,006,036 A | 2/1977 | Charkoudian |
| 4,007,472 A | 2/1977 | Land |
| 4,028,479 A | 6/1977 | Fanciullo et al. |
| 4,042,760 A | 8/1977 | Land |
| 4,047,289 A | 9/1977 | Wolff |
| 4,060,669 A | 11/1977 | Fanciullo |
| 4,070,528 A | 1/1978 | Bergum et al. |
| 4,080,728 A | 3/1978 | Buckler |
| 4,086,399 A | 4/1978 | Hyland et al. |
| 4,086,400 A | 4/1978 | Hyland et al. |
| 4,098,965 A | 7/1978 | Kinsman |
| 4,105,815 A | 8/1978 | Buckler |
| 4,105,831 A | 8/1978 | Plasse |
| 4,112,205 A | 9/1978 | Charkoudian et al. |
| 4,118,860 A | 10/1978 | Buckler et al. |
| 4,119,770 A | 10/1978 | Land |
| 4,124,742 A | 11/1978 | Land et al. |
| 4,125,684 A | 11/1978 | Land |
| 4,125,685 A | 11/1978 | Bloom et al. |
| 4,125,686 A | 11/1978 | Kinsman |
| 4,136,236 A | 1/1979 | Ruetschi |
| 4,137,627 A | 2/1979 | Kinsman |
| 4,145,485 A | 3/1979 | Kinsman |
| 4,150,200 A | 4/1979 | Sullivan |
| 4,152,825 A | 5/1979 | Bruneau |
| 4,172,184 A | 10/1979 | Bloom et al. |
| 4,172,319 A | 10/1979 | Bloom et al. |
| 4,175,052 A | 11/1979 | Norteman, Jr. |
| 4,177,330 A | 12/1979 | Gordon et al. |
| 4,177,552 A | 12/1979 | Gordon et al. |
| 4,181,778 A | 1/1980 | Land |
| 4,185,144 A | 1/1980 | Ames et al. |
| 4,194,061 A | 3/1980 | Land et al. |
| 4,195,121 A | 3/1980 | Peterson |
| 4,204,036 A | 5/1980 | Cohen et al. |
| 4,232,099 A | 11/1980 | Sullivan |
| 4,242,424 A | 12/1980 | Buckler et al. |
| 4,254,191 A | 3/1981 | Kniazzeh |
| 4,256,813 A | 3/1981 | Kniazzeh |
| 4,287,274 A | 9/1981 | Ibbotson et al. |
| 4,345,954 A | 8/1982 | Panchu |
| 4,361,633 A | 11/1982 | Nel et al. |
| 4,389,470 A | 6/1983 | Plasse |
| 4,400,452 A | 8/1983 | Bruder |
| 4,427,748 A | 1/1984 | Land |
| 4,429,026 A | 1/1984 | Bruder |
| 4,455,358 A | 6/1984 | Graham et al. |
| 4,466,470 A | 8/1984 | Bruder |
| 4,477,544 A | 10/1984 | Bruder |
| 4,502,903 A | 3/1985 | Bruder |
| 4,505,996 A | 3/1985 | Simonton |
| 4,525,439 A | 6/1985 | Simonton |
| 4,532,193 A | 7/1985 | Kniazzeh et al. |
| 4,539,275 A | 9/1985 | Plasse |
| 4,554,226 A | 11/1985 | Simonton |
| 4,604,334 A | 8/1986 | Tarascon |
| 4,608,279 A | 8/1986 | Schumm, Jr. |
| 4,609,597 A | 9/1986 | Plasse |
| 4,621,035 A | 11/1986 | Bruder |
| 4,623,598 A | 11/1986 | Waki et al. |
| 4,664,993 A | 5/1987 | Sturgis et al. |
| 4,756,717 A | 7/1988 | Sturgis et al. |
| 4,889,777 A | 12/1989 | Akuto |
| 4,916,035 A | 4/1990 | Yamashita et al. |
| 4,977,046 A | 12/1990 | Bleszinski, Jr. et al. |
| 4,997,732 A | 3/1991 | Austin et al. |
| 5,035,965 A | 7/1991 | Sangyoji et al. |
| 5,055,968 A | 10/1991 | Nishi et al. |
| 5,110,696 A | 5/1992 | Shokoohi et al. |
| 5,116,701 A | 5/1992 | Kalisz |
| 5,120,785 A | 6/1992 | Walker et al. |
| 5,217,828 A | 6/1993 | Sangyoji et al. |
| 5,259,891 A | 11/1993 | Matsuyama et al. |
| 5,326,652 A | 7/1994 | Lake |
| 5,330,860 A | 7/1994 | Grot et al. |
| 5,338,625 A | 8/1994 | Bates et al. |
| 5,350,645 A * | 9/1994 | Lake et al. .................. 429/124 |
| 5,401,590 A | 3/1995 | Chalilpoyil et al. |
| 5,415,888 A | 5/1995 | Banerjee et al. |
| 5,424,151 A | 6/1995 | Koksbang et al. |
| 5,445,856 A | 8/1995 | Chaloner-Gill |
| 5,455,127 A | 10/1995 | Olsen et al. |
| 5,470,357 A | 11/1995 | Schmutz et al. |
| 5,514,492 A | 5/1996 | Marincic et al. |
| 5,547,911 A | 8/1996 | Grot |
| 5,565,143 A | 10/1996 | Chan |
| 5,578,390 A | 11/1996 | Hughen |
| 5,587,254 A | 12/1996 | Kojima et al. |
| 5,620,580 A | 4/1997 | Okabe et al. |
| 5,622,652 A | 4/1997 | Kucherovsky et al. |
| 5,624,468 A | 4/1997 | Lake |
| 5,637,418 A | 6/1997 | Brown et al. |
| 5,652,043 A | 7/1997 | Nitzan |
| 5,658,684 A | 8/1997 | Lake |
| 5,728,181 A | 3/1998 | Jung et al. |
| 5,735,912 A | 4/1998 | Lake |
| 5,735,914 A | 4/1998 | Lake |
| 5,747,190 A | 5/1998 | Lake |
| 5,747,191 A | 5/1998 | Lake |
| 5,759,215 A | 6/1998 | Masuda |
| 5,779,839 A | 7/1998 | Tuttle et al. |
| 5,811,204 A | 9/1998 | Nitzan |
| 5,865,859 A | 2/1999 | Lake |
| 5,897,522 A | 4/1999 | Nitzan |
| 5,906,661 A | 5/1999 | Lake |
| 5,930,023 A | 7/1999 | Mitchell, Jr. et al. |
| 5,941,844 A | 8/1999 | Eckenhoff |
| 6,025,089 A | 2/2000 | Lake |
| 6,030,423 A | 2/2000 | Lake |
| 6,030,721 A | 2/2000 | Lake |
| 6,045,942 A | 4/2000 | Miekka et al. |
| 6,078,842 A | 6/2000 | Gross et al. |
| 6,084,380 A | 7/2000 | Burton |
| RE36,843 E | 8/2000 | Lake et al. |
| 6,136,468 A | 10/2000 | Mitchell, Jr. et al. |
| 6,157,858 A | 12/2000 | Gross et al. |
| 6,186,982 B1 | 2/2001 | Gross et al. |
| 6,187,475 B1 | 2/2001 | Oh et al. |
| 6,200,704 B1 | 3/2001 | Katz et al. |
| 6,208,524 B1 | 3/2001 | Tuttle |
| 6,235,422 B1 | 5/2001 | Kaplan et al. |
| 6,243,192 B1 | 6/2001 | Mitchell, Jr. et al. |
| 6,273,904 B1 | 8/2001 | Chen et al. |
| 6,277,520 B1 | 8/2001 | Moutsios et al. |
| 6,278,904 B1 | 8/2001 | Ishii |
| 6,317,630 B1 | 11/2001 | Gross et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 6,421,561 B1 | 7/2002 | Morris |
| 6,458,234 B1 | 10/2002 | Lake et al. |
| 6,503,658 B1 | 1/2003 | Klein et al. |
| 6,569,572 B1 | 5/2003 | Ochiai et al. |
| 6,576,364 B1 | 6/2003 | Mitchell, Jr. et al. |
| 6,643,532 B2 | 11/2003 | Axelgaard |
| 6,653,014 B2 | 11/2003 | Anderson et al. |

(56) References Cited

U.S. PATENT DOCUMENTS

| | | |
|---|---|---|
| 6,664,006 B1 | 12/2003 | Munshi |
| 6,676,021 B1 | 1/2004 | Luski et al. |
| 6,676,714 B2 | 1/2004 | Langan |
| 6,697,694 B2 | 2/2004 | Mogensen |
| 6,708,050 B2 | 3/2004 | Carim |
| 6,709,778 B2 | 3/2004 | Johnson |
| 6,729,025 B2 | 5/2004 | Farrell et al. |
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,838,209 B2 | 1/2005 | Langan et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,224,280 B2 | 5/2007 | Ferguson et al. |
| RE39,676 E | 6/2007 | Nitzan |
| 7,238,196 B2 | 7/2007 | Wibaux |
| 7,244,326 B2 | 7/2007 | Craig et al. |
| 7,294,209 B2 | 11/2007 | Shakespeare |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,603,144 B2 | 10/2009 | Jenson et al. |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson |
| 2002/0192542 A1 | 12/2002 | Luski et al. |
| 2003/0014014 A1 | 1/2003 | Nitzan et al. |
| 2003/0059673 A1 | 3/2003 | Langan et al. |
| 2003/0082437 A1 | 5/2003 | Sotomura |
| 2003/0165744 A1 | 9/2003 | Schubert et al. |
| 2003/0187338 A1 | 10/2003 | Say et al. |
| 2003/0219648 A1 | 11/2003 | Zucker |
| 2003/0232248 A1 | 12/2003 | Iwamoto et al. |
| 2004/0001998 A1 | 1/2004 | Hopkins et al. |
| 2004/0018422 A1 | 1/2004 | Islam et al. |
| 2004/0053124 A1* | 3/2004 | LaFollette et al. ............ 429/149 |
| 2004/0170896 A1 | 9/2004 | Murata et al. |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2005/0260492 A1 | 11/2005 | Tucholski et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0131616 A1 | 6/2006 | Devaney et al. |
| 2006/0159899 A1 | 7/2006 | Edwards et al. |
| 2006/0211936 A1 | 9/2006 | Hu et al. |
| 2006/0216586 A1 | 9/2006 | Tucholski |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0243459 A1 | 10/2007 | Jenson et al. |
| 2008/0007409 A1 | 1/2008 | Ferry et al. |
| 2008/0021436 A1 | 1/2008 | Wolpert et al. |
| 2008/0091095 A1 | 4/2008 | Heller et al. |
| 2008/0174380 A1 | 7/2008 | Nitzan et al. |
| 2008/0218345 A1 | 9/2008 | Nitzan et al. |
| 2008/0272890 A1 | 11/2008 | Nitzan et al. |
| 2010/0209756 A1 | 8/2010 | Bailey et al. |

FOREIGN PATENT DOCUMENTS

| | | |
|---|---|---|
| EP | 0862227 A1 | 9/1998 |
| EP | 1 026 767 A1 | 8/2000 |
| EP | 1096589 A1 | 5/2001 |
| EP | 1107336 A2 | 6/2001 |
| JP | S55-133770 A | 10/1980 |
| JP | 58-206048 A | 12/1983 |
| JP | S59-228353 A | 12/1984 |
| JP | S61-55866 A | 3/1986 |
| JP | 61-64077 A | 4/1986 |
| JP | 62-126557 A | 6/1987 |
| JP | S62-165875 A | 7/1987 |
| JP | S62-165876 A | 7/1987 |
| JP | 62-285954 A | 12/1987 |
| JP | 63-081762 | 4/1988 |
| JP | 63-119155 A | 5/1988 |
| JP | S64-24364 A | 1/1989 |
| JP | H02-273464 | 11/1990 |
| JP | H04-276665 | 10/1992 |
| JP | 5-217587 A | 8/1993 |
| JP | 5-225989 A | 9/1993 |
| JP | 5-275087 A | 10/1993 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 A | 11/2004 |
| JP | 2005-39256 A | 2/2005 |
| TW | 540185 B | 7/2003 |
| WO | 96/38867 A1 | 12/1996 |
| WO | 97/17735 A1 | 5/1997 |
| WO | 98/48469 A1 | 10/1998 |
| WO | 00/36672 A1 | 6/2000 |
| WO | 03/069700 A2 | 8/2003 |
| WO | 2005/101973 A2 | 11/2005 |
| WO | WO 2005101973 A2 * | 11/2005 |
| WO | 2006/003648 A2 | 1/2006 |

OTHER PUBLICATIONS

Hartman, Lauren R., "Flexibles stay resilient," Packaging Digest, Mar. 1, 2005.

Acheson Colloids Company, "Sales Information Bulletin," Port Huron, MI.

Acheson Industries, "Acheson Electrical Materials," from www.achesonindustries.com, dated Nov. 24, 2009.

Advanced Coatings and Chemicals, "Technical Data Sheet," Temple City, CA.

(56) References Cited

OTHER PUBLICATIONS

Linden, D., Handbook of Batteries and Fuel Cells, pp. 5.5-5.7, McGraw-Hill, Inc., 1984.

Linden, D., Handbook of Batteries, Second Edition, pp. 8.8-8.9, McGraw-Hill, Inc., 1995.

International Search Report and Written Opinion issued Aug. 6, 2009 in related PCT Application PCT/US2008/087424.

Omnexus Adhesives & Sealant Solutions, "Ethylene Vinyl Acetate (EVA) and Other Hot Melts," from http://www.omnexus4adhesives.com/bc/construction-channel/index.aspx?id=ethylene.

* cited by examiner

HIGH CURRENT THIN ELECTROCHEMICAL CELL AND METHODS OF MAKING THE SAME

CROSS-REFERENCE TO RELATED APPLICATIONS

This application claims the benefit of U.S. provisional application Ser. No. 61/014,826, filed on Dec. 19, 2007, which is incorporated herein in its entirety by reference thereto.

BACKGROUND OF THE INVENTION

This application relates generally to an electrochemical cell or battery, and more specifically relates to a flat, thin, electrochemical cell utilizing a picture frame feature and its method of manufacture, including printing methods. Even more specifically, this invention relates to a thin printable cell comprising two or more electrodes, a separator, electrolyte, and a cell frame between two laminated film layers, and its method of manufacture.

For the past one hundred years or so, scientists have been making Carbon/Zinc portable power sources for various applications. In the early days of portable power, these power sources were very large compared to today's standards. For example, the very popular "Igniter Cell" made by Eveready was about 3" diameter and about 9" tall and was used in many applications such as radios, buzzers, Xmas lighting, etc. These large cells, as well as some smaller versions, such as the famous Eveready #6 (about 2" dia.×6" tall) and the smallest unit cell of the day, the #950 (D size), were commonly made into battery packs with voltages exceeding 40 volts in some applications. These were similar in size, and even larger, than today's car batteries, for uses in lighting devices, radios and car ignition systems. In the mid 1900's, with the advent of advanced electronics such as the transistor, the electrical requirements for portable power sources were drastically reduced. Consequently, cell sizes could also be reduced to include C's, AA's, and AAA's, and even small button cells. This power reduction has continued into the twenty-first century, where applications such as smart labels, smart credit cards, sensors, data loggers, novelty devices such as greeting cards and badges, etc., now require a maximum current of several milliamperes, with many applications requiring as little as a few microamperes at about 1.5-3.0 volts. These applications also have the requirement that the power sources be flat and very thin to maintain their low profiles and portability.

In the past twenty-five years, various approaches for making thin, flat cells and batteries were attempted by numerous scientists and corporations. These include the widely known instant film battery pack developed by Polaroid. This battery pack was used in each package of Polaroid instant film. This allowed Polaroid to have a fresh battery in the camera each time the user placed a new pack of film in the camera. This high cost battery with multiple layers and a metal foil laminate package is a high voltage, high current battery, capable of igniting flash bulbs and powering motors, for example, and is not a realistic competitor of the new thin low cost batteries that are needed. In addition to Polaroid, others have tried to develop thin batteries in various electrochemical systems.

Co-pending U.S. application Ser. Nos. 11/110,202 filed on Apr. 20, 2005 and 11/378,520 filed on Mar. 17, 2006 incorporated herein by reference, discuss new designs and methods of manufacture of a flat cell and battery.

With the growing market needs for low cost, low capacity thin flat cells, it would be beneficial to produce a thin, flat, printable flexible cell that is versatile and inexpensive to mass-produce. Printable, disposable thin cells that are well suited for low-power and high-production volume applications would be useful, especially if they offer adequate voltage, sufficient capacity, and low-cost solutions. Conventional low-profile batteries typically have few of these attributes, if any.

Furthermore, in recent years there has been a growing need for various electronic devices, such as active RFID tags, sensors with RFID tags, skin patches that deliver iontophoretic or other electrical functionality, etc. These various electronic devices can have various electrical loading characteristics. Thus, it can be beneficial to provide thin flat power sources that can reliably deliver relatively higher currents. In one example, the thin flat power sources can be separately manufactured and later electrically coupled to various electronic devices. In another example, the manufacture of the thin flat power sources can be integrated with the manufacture of the desired circuitry of electrical components to power the components.

SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with one aspect of the present invention, a method of manufacturing a battery including at least one electrochemical cell for generating an electrical current is provided. The method includes the step of providing a first substrate and a second substrate, said first substrate including a first side. The method further includes the steps of providing a plurality of cathode layers on said first side of said first substrate, providing a dielectric layer on said cathode collector layer, and providing an anode layer on said dielectric layer. At least a portion of said anode layer is located between an adjacent two of the plurality of cathode layers. The method further includes the steps of providing an electrolyte layer including a viscous liquid in contact with said cathode layer and also in contact with said anode layer, providing a frame as an intermediate spacer layer on said first side of said first substrate to form an inner space containing said electrolyte, and also containing at least a major portion of said cathode layer and at least a major portion of said anode layer within said inner space. The method further includes the step of connecting said second substrate to said first substrate via the intermediate spacer layer to substantially seal said inner space containing said cathode layer, said anode layer, and said electrolyte layer.

In accordance with another aspect of the present invention, a method of manufacturing a battery including at least one electrochemical cell for generating an electrical current is provided. The method includes the step of providing a first substrate and a second substrate, where at least one of which includes a web having a plurality of layers and said first substrate includes a first side. The method further includes the steps of printing a cathode collector layer on said first side of said first substrate, providing a dielectric layer on said cathode collector layer, printing a plurality of cathode layers on said cathode collector layer, and laminating an anode layer on said dielectric layer. The method further includes the steps of providing an electrolyte layer including a viscous liquid in contact with said plurality of cathode layers and also in contact with said anode layer, providing a frame on said first side of said first substrate to form an inner space containing said electrolyte, and also containing at least a major portion of said plurality of cathode layers and at least a major portion of said anode layer within said inner space. The method further includes the step of connecting said second substrate to said first substrate via a third web utilized as a spacer to substantially seal said inner space containing said plurality of cathode layers, said anode layer, and said electrolyte layer.

In accordance with yet another aspect of the present invention, a battery including at least one electrochemical cell for generating an electrical current. The battery includes a first substrate including of a plurality of laminated layers and defining a first side and a second side, and a second substrate. The device further includes a cathode collector layer provided on said first side of said first substrate, a plurality of cathode layers provided on said cathode collector layer, a dielectric layer provided on said cathode collector layer between at least an adjacent two of the plurality of cathode layers, and an anode layer provided on said dielectric layer, said anode layer being insulated from said cathode collector layer by said dielectric layer. The device further includes an electrolyte layer including a viscous liquid in contact with said plurality of cathode layers and also in contact with said anode layer, and a frame interposed between said first and second substrate to connect and seal said first substrate to said second substrate to form an inner space containing said electrolyte. The frame also contains at least a major portion of said plurality of cathode layers and at least a major portion of said anode layer within said inner space, wherein at least one of said anode layer and said plurality of cathode layers include a cured or dried ink.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS OF THE INVENTION

Figure 1:
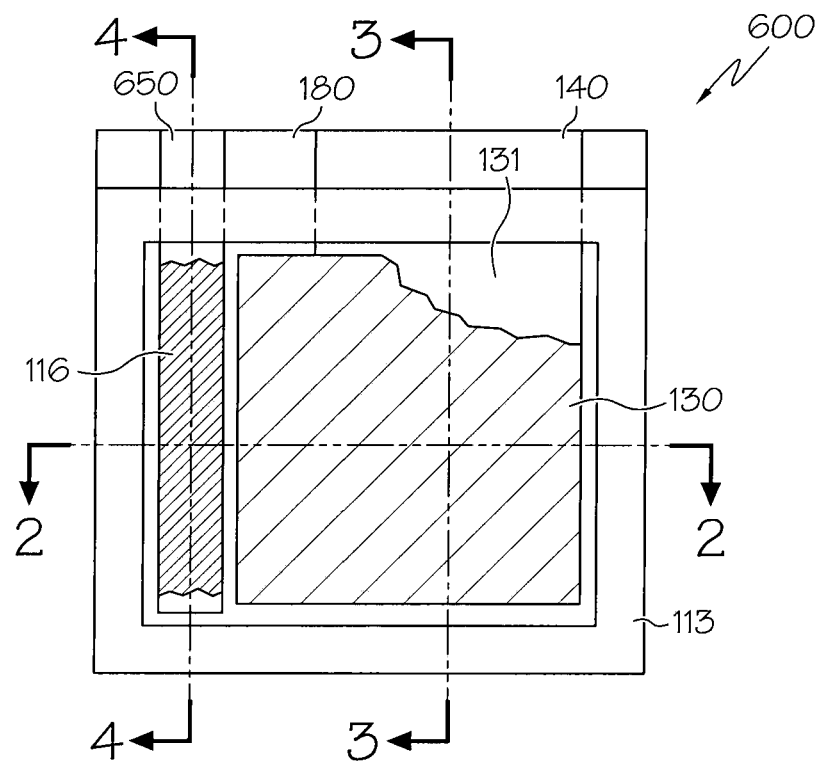
FIG. 1 illustrates a plan view of prior art unit cell 600.
Figure 2:
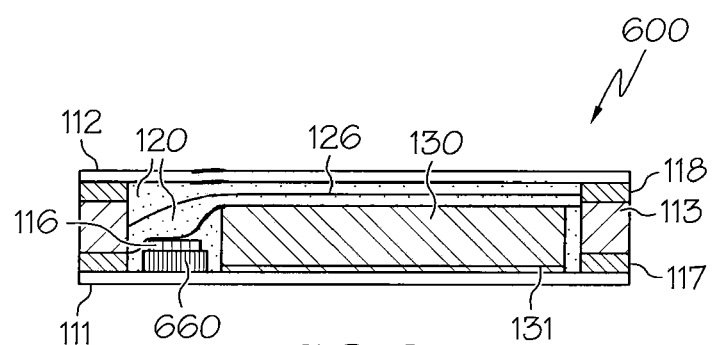
FIG. 2 illustrates a cross section view of the prior art unit cell 600 taken through electrode areas along line 2-2 of FIG. 1.
Figure 3:
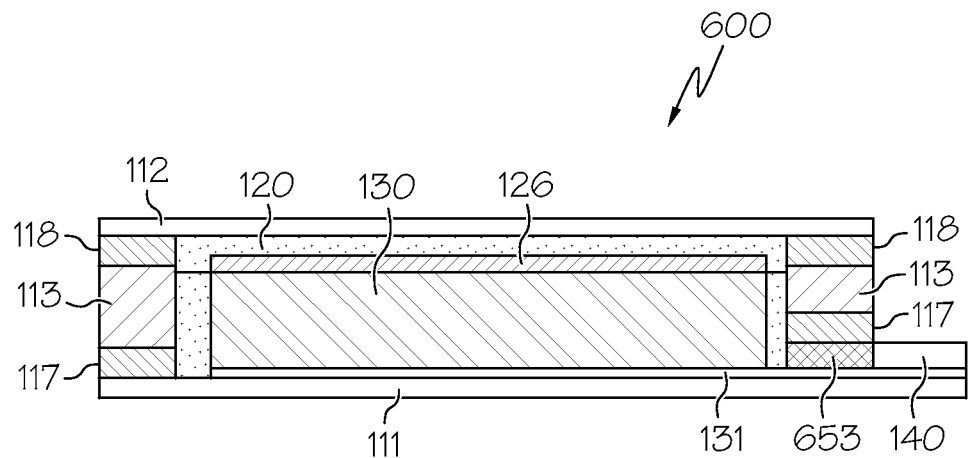
FIG. 3 illustrates a cross section view of the prior art unit cell 600 taken through the entire length of the first electrode along line 3-3 of FIG. 1.
Figure 4:
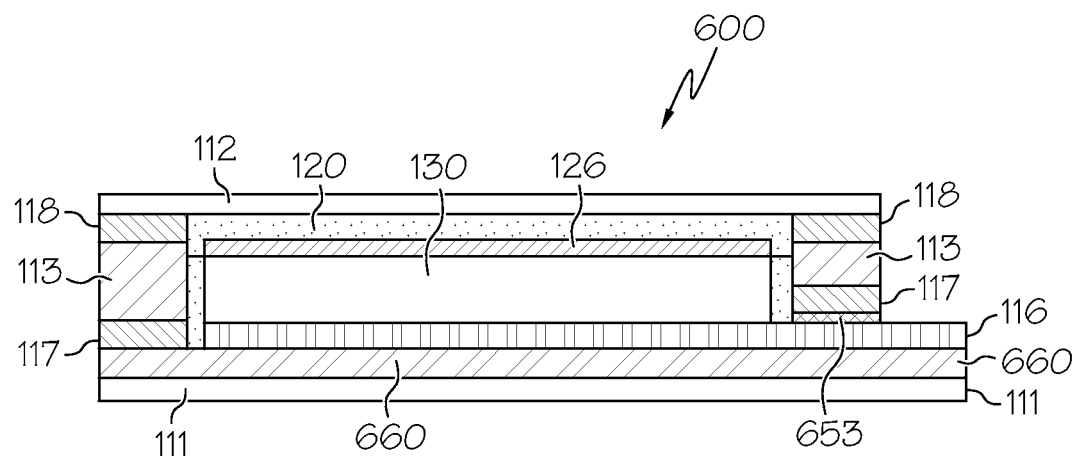
FIG. 4 illustrates a cross section view of the prior art unit cell 600 taken through the entire length of the second electrode along line 4-4 of FIG. 1.

Generally, this application relates to a high current thin electrochemical cell in a co-planar construction and method of manufacturing said electrochemical cell. In one example, the electrochemical cells (i.e., batteries) are typically printed and/or laminated on a continuous, flexible substrate web, and may be formed into a roll or the like. The individual batteries can be removed from the roll, such as one at a time. For example, the batteries can be cut from the roll, and/or perforations of the flexible substrate roll can be provided for easy tear off. In addition, the batteries can further include one or more electrical components, such as an antenna and/or a processor, for example. The multiple facets of this application could be used in the total package described and/or they could be used individually or in any combination.

As used herein, unless otherwise explicitly indicated, all percentages are percentages by weight. Also, as used herein, when a range such as "5-25" (or "about 5-25") is given, this means, for at least one embodiment, at least about 5 and, separately and independently, not more than about 25, and unless otherwise indicated, ranges are not to be strictly construed, but are given as acceptable examples. Also herein, a parenthetical range following a listed or preferred value indicates a broader range for that value according to additional embodiments of the application.

The present application relates to thin, printed electrochemical cells and/or batteries comprising a plurality of such cells. Such cells each typically include at least a first electrode including a first electrochemical layer (e.g., a cathode), a second electrode including a second electrochemical layer (e.g., an anode), and an electrolyte that interacts with the electrodes to create an electrical current. All of the first and second electrodes and the electrolyte are typically contained within some structure which provides an external electrical access to the electrodes for providing an electrical current supply to some device.

One method of mass-producing such cells includes depositing aqueous and/or non-aqueous solvent inks and/or other coatings in a pattern on a special substrate, such as a laminated polymeric film layer, for example. The depositing can be by means of, for example, printing electrochemical inks and/or laminating a metallic foil, such as zinc foil, for example, on one or more high-speed web rotary screen printing presses, especially if the desired volumes are very high. If volumes are relatively lower, say in the quantities of only about several million or less, then relatively slower methods such as web printing with flat bed screens could be appropriate. If the volumes are even lower, such as hundreds or thousands, then a sheet-fed flat bed printing press may be utilized, for example. Still, various printing methods can be used for various desired quantities.

After the inks are printed and/or the solids have been properly placed, the cells can be completed (e.g., sealed, die cut, stacked and/or perforated and wound into a roll, or stacked if sheets are used on a printing press). This cell manufacturing process can also be utilized for integrating one or more individual cells with an actual electronic application, or into batteries comprising multiple cells connected in series or parallel, or some combination of the two. Examples of such devices and corresponding processes will be described later, but many additional embodiments are also contemplated.

As discussed above, the battery may be described as a printed, flexible, and thin electrochemical cell. Such a cell can include, for example, a lower film substrate that can utilize a special polymer laminate that has special features, possibly including, for example, a high moisture barrier layer in the center that is surrounded by polymer films on both sides. Furthermore, one or both outside surfaces can be made to be print receptive for printing information, logos, instructions, identifications, serial numbers, graphics, or other information or images, as desired.

Depending on which construction of this battery is used, the inner ply of the substrate could also feature a heat-sealing layer that might be co-extruded on the side opposite the barrier coating.

In addition, a portion of the inner surface of a lower substrate layer of a cell of at least some embodiments could utilize a cathode current collector, such as carbon, for example, printed or coated or otherwise applied on a portion of the film substrate. At an outside contact area of this collector can also be printed a layer of a relatively highly conductive ink, such as silver, nickel, or tin, for example, to improve the conductivity to the application connection, if desired. However, if the battery application is used for relatively low current requirements, then the higher conductive layer material, or even the current collector, may not be utilized for one or both electrodes.

For at least some embodiments, a water-based ink electrochemical layer is printed as the cathode. Such a cathode layer can include, for example, manganese dioxide ($MnO_2$), carbon, and a polymer binder. Other formulations for the cathode layer can also be utilized with or without any of these materials. If a cathode collector layer is used, which may or may not form a portion of the cathode layer, the cathode electrochemical layer will be printed on at least a portion of the cathode current collector, which is printed or otherwise applied first to the substrate.

Regarding the anode, in an off-line operation, a dry-film adhesive layer, possibly using a release liner, can be applied to the zinc foil. The zinc foil can then be laminated to the base substrate.

Optionally, printed over one or both the anode and cathode, is a starch ink or similar material. The starch ink can act as an electrolyte absorber to keep the electrodes "wet" after an aqueous electrolyte solution is added to the cell. This starch ink could also include the electrolyte salts and the water used for the cell reaction. A paper layer over the anode and cathode could be used in place of the printed starch.

For some embodiments, after the two electrodes are in place, with or without the starch layer(s), a cell "picture frame" can be added. This could be done using a number of different methods. One method is to print this cell picture frame with a dielectric ink, for example. Another method is to utilize a polymer sheet or a laminated polymer sheet that includes adhesive layers, that is stamped, die cut, laser cut or similar methods to form the appropriate "pockets" (inner space or spaces) to house materials of each unit cell as well as to expose the electrical contacts to connect the device.

To ensure good sealing of the picture frame to the substrates, and to provide good sealing of the contact feedthroughs (providing an electrical pathway from the cell inside to the cell exterior), a sealing or caulking adhesive could be printed on the substrate, such as in the same pattern as the cell frame, for example, prior to the frame being printed or prior to the polymer sheets being inserted, for example.

This sealing or caulking material could be pressure sensitive, and/or heat sensitive, for example, such as Acheson Colloids' PM040, for example, or any other type of material that would facilitate sealing to both surfaces.

After the dielectric picture frame is printed and dried and/or cured, a heat sensitive sealing adhesive can be printed on top of the frame to allow good sealing of the top substrate to the cell frame. This cell picture frame could also comprise a polymer film or a laminated film of about 0.015" thick (range of about 0.003"-0.050") that is pre-punched and then laminated in registration to match the preprinted caulking adhesive layer described above.

Zinc chloride ($ZnCl_2$) can be chosen as the electrolyte, for at least some embodiments, in the concentration range of about 18%-45% by weight, for example. In one example, about 27% may be preferred. The electrolyte can be added, for example, to the open cell. To facilitate processing on the line, this electrolyte, or a different electrolyte, could be thickened with, for example, CMC at about a level of about 0.6 wgt % (range of about 0.05%-1.0%).

Other useful electrolyte formulations, such as ammonium chloride ($NH_4Cl$), mixtures of zinc chloride ($ZnCl_2$) and ammonium chloride ($NH_4Cl$), zinc acetate ($Zn(C_2H_2O_2)$), zinc bromide ($ZnBr_2$), zinc fluoride ($ZnF_2$), zinc tartrate ($ZnC_4H_4O_6.H_2O$), zinc per-chlorate $Zn(ClO_4)_2.6H_2O$), potassium hydroxide, sodium hydroxide, or organics, for example, could also be used.

Zinc chloride may be the electrolyte of choice, providing excellent electrical performance for ordinary environmental conditions normally encountered. Likewise, any of the above mentioned alternative electrolytes, among others, could be used in concentrations (by weight), for example, within the range of about 18%-45%, with the range of about 25%-35% used for at least some other embodiments. Such compositions could also provide acceptable performance under ordinary environmental conditions.

The use of electrolytes other than of zinc chloride can provide improved cell/battery electrical performance under some differing environmental conditions. For example, about 32% by weight zinc acetate (F.P.—freezing point—about 28° C.) exhibits a lower freezing point than about 32% by weight zinc chloride (F.P. about −23° C.). Both of these solutions exhibit a lower freezing point than of about 27% zinc chloride (F.P. about −18° C.). Other zinc acetate concentrations, e.g. about 18-45 or about 25-35 weight percent, also exhibit reduced freezing points.

Use of such electrolyte formulations as substitutes for zinc chloride, or in various mixtures used in cells, can allow for improved performance at low temperatures. For example, it has been found that the use of an about 32% zinc acetate electrolyte substantially improves low temperature (i.e. below about −20° C.) performance of a voltaic cell. This type of electrochemical cell performance improvement at low temperature can be utilized in the growing business of battery assisted RFID tags, for example, and/or other transient (transportable) electrically operated devices, such as smart active labels and temperature tags, for example, which may be used in cold environments.

For example, many products that are shipped today, such as food products pharmaceuticals, blood, etc, may require low temperature storage and shipping conditions, or even low temperature operation. To ensure safe shipment of such goods, these items can be tracked with active RFID tags and/or sensors. These tags and/or labels might require electrochemical cells and/or batteries to operate effectively at temperatures at, or even below, −20° C., such as at about −23° C., about −27° C., or even at about −30° C. or less.

When zinc acetate is used to achieve improved low temperature performance for low temperature applications, the zinc acetate concentration in the range of about 31-33, is often acceptable, although ranges of about 30-34, about 28-36, about 26-38, and even about 25-40, weight percent, could also be utilized.

In at least one embodiment, the construction of the printed starch layer with the addition of the aqueous electrolyte could be replaced, for example, by a printable viscous liquid (which could include a gel, or some other viscous material) that effectively covers at least a portion of each electrode. One such printable gel is described in United States Patent Publication 2003/0165744A1, published on Sep. 4, 2003, and incorporated herein by reference. These viscous formulations could, for example, utilize the electrolyte formulas and concentrations previously discussed.

The upper substrate of a cell package could utilize a special laminated polymeric film, which has an edge that extends beyond the internal cell/battery components onto the cell frame. The upper layer is sealed around the edges of the cell frame by means of a pressure sensitive adhesive (PSA), and/or with the heat sensitive sealing adhesive that was previously printed, thus confining the internal components within the cell frame.

The above-described constructions can be wet cell constructions; however, using a similar cell construction, the battery could be also be made into a reserve cell construction, which has the benefit of providing extended shelf life prior to the application of a liquid. The printable, flexible, zinc chloride thin cell can be made environmentally friendly. Such a construction could be utilized which does not require the use of harmful components, such as mercury or cadmium, for example. Old and/or depleted cells of this design could thus be disposed using regular waste removal procedures.

The devices for which this technology can be used are extensive. Devices that utilize relatively low power or a limited life of one to three years, and possibly longer, could function utilizing a thin cell/battery of the type described herein. The cell, as explained in the above paragraphs and below, can often be inexpensively mass-produced so that it can be used in a disposable product, for example. The low cost allows for applications that previously were not cost effective.

The electrochemical cell/battery according to the application might have one or more of the following advantages:
  Relatively thin;
  Flat, and of relatively uniform thickness, where the edges are of about the same thickness as the center;
  Flexible;
  Many geometric shapes are possible;
  Sealed container;
  Simple construction;
  Designed for high speed and high volume production;
  Low cost;
  Reliable performance at many temperatures;
  Good low temperature performance;
  Disposable and environmentally friendly;
  Both cell contacts provided on the same surface;
  Ease of assembly into an application; and
  Capable of being easily integrated in a continuous process at the same time that the electronic application is being made.

The above was a general description of various cell constructions according to some embodiments of this application, and further details utilizing drawings follow below. Cell and battery production processes for cell printing and assembly also will be described as well.

In one example, such as where relatively high speed, high output manufacturing is contemplated, such as 50 linear feet per minute or another relatively high speed, multiple webs can be used. It is to be understood that the multiple webs can be generally continuous, and can be utilized with known web manufacturing equipment. A first web can be relatively thin, such as ~0.002"-0.010" and preferably about 0.003-0.006", flexible base substrate including a multi-ply laminated structure or single ply material. In one example, the multi-ply structure can include five layers. Alternatively, the single ply material can include various materials, such as Kapton or polyester. A second web can be a relatively thick laminated structure including a PVC or Polyester film that is about 0.005-0.030" thick, and preferably about 0.010-0.015" thick. The second web can have a layer of pressure sensitive adhesive at about 1-5 mils thick on one side. After this laminated structure of the second web is completed, it can be applied to the first web. In addition or alternatively, the second web can be pattern cut using any type of mechanical means to allow for cavities for the cells active materials as well as an optional cavity for the cell/battery contacts. A third web can be a relatively thin laminated structure the same and/or similar to the first web. The completed three web structure may have a pressure sensitive adhesive on either side to allow the individual device assembly to be applied as a label. The cell/battery may be of the thin cell type, such as disclosed in co-pending application Ser. No. 11/110,202, filed on Apr. 20, 2005 and incorporated herein by reference, and/or the cells disclosed in co-pending application Ser. No. 11/378,520, filed on Mar. 17, 2006, and also incorporated herein by reference.

The various conductive inks described herein could be based on many types of conductive materials such as carbon, silver, nickel, silver coated copper, copper, silver chloride, zinc and/or mixtures of these. For example, one such material that shows useful properties in terms of conductivity and flexibility is Acheson Colloids (Port Huron, Mich.) PM046. Furthermore, various circuits, electrical pathways, antennas, etc. that might be part of the printed circuitry can be made by etching aluminum, copper or similar type metallic foils that are laminated on a polymer such as Kapton substrate. This could be done with many types (sizes and frequencies) of pathways and/or antennas whether they are etched or printed.

Turning now to FIGS. 1-4, the prior art generally included a thin printed flexible electrochemical cell using a sealed "picture frame" structure, for example, that includes a printed cathode deposited on a printed cathode collector (e.g, a highly conductive carbon cathode collector) with a printed or foil strip anode placed adjacent to the cathode. Electrochemical cells/batteries of this type are described in U.S. patent application Ser. No. 11/378,520, the disclosure of which is incorporated herein by reference. The electrochemical cell/battery also includes a viscous or gelled electrolyte that is dispensed onto a separator that covers all or part of the anode and cathode, and a top laminate can then be sealed onto the picture frame. This type of electrochemical cell was designed to be easily made by printing (e.g., through use of a printing press), and allows, for example, for the cell/battery to be directly integrated with an electronic application.

The prior art electrochemical cell, also referred to herein as the standard construction, is further described by FIGS. 1-4 which show an embodiment of a completed unit cell 600 in plan and sectional views. The cell 600 includes a top laminated film substrate (layer) 112, a lower laminated film substrate (layer) 111, and an extended area 180 that has a silver printed positive contact 140 and negative contact 650. Additionally, the cell 600 includes a cathode layer 130 and an anode layer 116, each comprised of an electrochemical layer of a different composition that can interact through an electrolyte to create an electrical current. To provide greater clarity, cell 600 in FIG. 1 is shown without the top laminate 112.

Prior to applying the cathode layer 130, a cathode collector 131 of highly conductive carbon is printed on the lower laminated substrate 111. In at least one embodiment, on the large area part of the cathode collector 131, the cathode layer 130 is printed using an ink comprising manganese dioxide, a conductor such as carbon (e.g., graphite) for example, a binder, and water. The anode layer 116 can be printed as a conductive zinc ink, or be provided as a zinc foil (116) PSA (660) laminate as shown in the figures, either of which can be made about 0.20" wide and about 0.002" (0.001"-0.010") thick. After the electrode layers (anode layer 116 and cathode layer 130) are in place, a "picture frame" 113 is placed around the electrodes. The picture frame 113 can comprise a die cut polymer laminate sheet, such as a polyester or polyvinyl chloride (PVC) etc, and can be further provided with two layers of pressure sensitive adhesive (118 on the top surface and 117 on the bottom surface). The top pressure sensitive adhesive (PSA) layer 118 seals the top laminate substrate 112 to the picture frame 113 and bottom PSA layer 117 can be used to seal the bottom laminate substrate 111 to the picture frame 113.

The picture frame assembly has a total thickness (excluding the thickness of the liners) of about 0.015" (about 0.005"-0.50"). The picture frame can be placed on the lower laminate substrate 111 after removing a bottom release liner so that the electrodes are centered within the frame. In some cases, to ensure a leak-free construction, a sealing and/or caulking adhesive, a heat sensitive sealant, and/or double sided PSA tape 653 can be placed and/or printed on top of the anode 116 and on top of cathode collector layer 131 in an area that falls under the picture frame 113. The sealing adhesive 653 can also be provided underneath the remainder of the picture frame 113.

If the electrolyte is not part of the gelled coating, a cell electrolyte 120 is provided to an absorbent material such as a "paper separator" 126 (not shown in FIG. 1 for clarity, see FIG. 2) that covers or partially covers both electrodes. The electrolyte can be an aqueous solution of $ZnCl_2$ at weight percent of about 27% (about 23%-43%) that could also contain a thickener, such as carboxymethylcellulose (CMC) or other similar materials at about 0.6% level (about 0.1%-2%). The cell is completed by applying and sealing the top laminate 112 over the picture frame using the PSA and/or with a heat seal.

The prior art batteries described above have a co-planar construction. A co-planar construction provided several advantages, in that they are easy to manufacture and provide consistent, reliable performance. However, they are designed primarily as a power sources that supply relatively low levels of current. Thus, there is an increasing need for a thin flat power source that can reliably deliver currents higher than those provided by the standard co-planar electrochemical cell construction.

Figure 5:
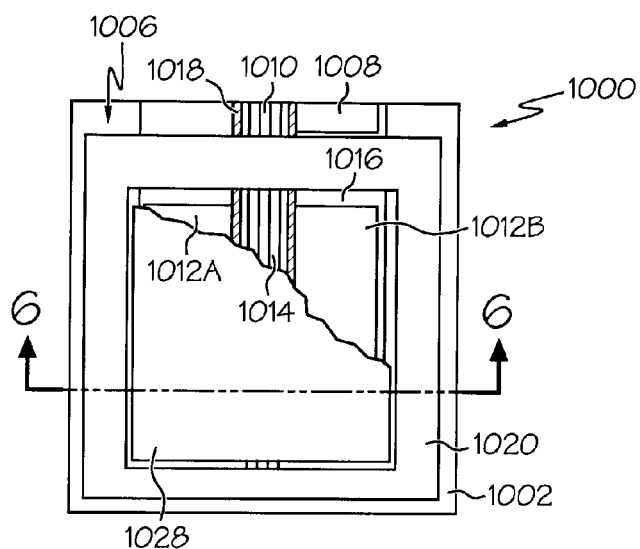
FIG. 5 illustrates a top, partial detail view of an example high current thin electrochemical cell.
Figure 6:
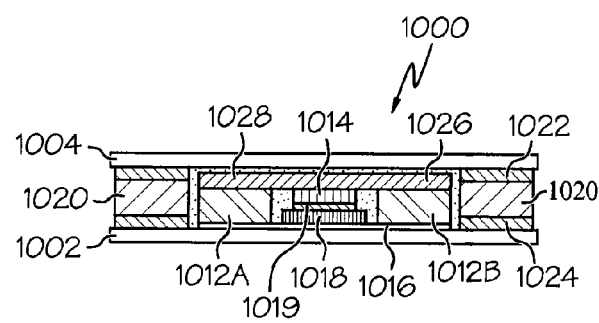
FIG. 6 illustrates a cross section view of the electrochemical cell taken through line 6-6 of FIG. 5.

Due to the need for thin flat power sources that can reliably deliver higher currents, constructions were sought that had the same advantages as the earlier co-planar cells/batteries, but could also deliver higher currents. As shown in FIGS. 5-6, a top view and cross section of the new co-planar construction is illustrated, referred to herein as the High Drain ("HD") design, that is capable of delivering higher currents. The HD design has some significant performance advantages. These generally include one or more of the following; such as lower cathode collector resistance; lower cell internal resistance which results in higher pulse voltages on the same load; a pulse voltage improvement that is larger as the current becomes higher; and/or an increased operating time to high voltage cutoffs on higher drain tests. The HD design electrochemical cell was also designed to be easily made by printing (e.g., through use of a printing press), and allows, for example, for the cell/battery to be directly integrated with an electronic application.

Turning now to FIGS. 5-6, a completed HD unit cell/battery 1000 is illustrated in plan and sectional views. The HD cell 1000 generally includes a lower laminated film substrate (single or multi-layer) 1002, an upper laminated film substrate (single or multi-layer) 1004, and an extended area 1006 that has at least one positive contact 1008 and at least one negative contact 1010. Additionally, the HD cell 1000 includes a plurality of cathode layers 1012A, 1012B and at least one anode layer 1014. The cathode layers can be comprised of an electrochemical layer of a different composition than the anode layer that can interact through an electrolyte to create an electrical current. Each of the cathode layers 1012A, 1012B and anode layer 1014 can be provided on a first side of the lower substrate 1002. To provide greater clarity, HD cell 1000 in FIG. 5 is shown without the top laminate 1004.

Prior to applying the plurality of cathode layers 1012A, 1012B, a cathode collector 1016 of highly conductive carbon can be printed on the lower laminated substrate 1002. In at least one embodiment, on the large area part of the cathode collector 1016, each of the cathode layers 1012A, 1012B is printed using an ink comprising manganese dioxide, a conductor such as carbon (e.g., graphite) for example, a binder, and water. Various numbers of cathode layers can be utilized. The anode layer 1014 can be printed as a conductive zinc ink, or as shown be provided as a zinc foil (1014) PSA (1019) laminate, either of which can be made about 0.20" wide and about 0.002" (0.001"-0.010") thick. An aqueous gelled coating layer (not shown) that may include $ZnCl_2$ electrolyte can be printed over the anode layer (not shown in FIGS. 1, and 2), as well as in the gaps that separates the anode layer 1014 from each of the cathode layers 1012A, 1012B. To avoid electrical shorting within the cell 1000, a dielectric layer 1018 can be provided, such as printed or laminated, upon the cathode collector 1016 where the anode layer 1014 crosses thereover. Thus, the anode layer 1014 can be insulated from said cathode collector layer 1016 by said dielectric layer 1018. The anode layer 1014 can be printed or laminated upon the insulating dielectric layer 1018 that is provided on the cathode collector 1016. The insulating layer 1018 can include various dielectric or electrically-neutral materials, such as polyvinyl chloride, polyester, and/or various adhesives, such as heat sensitive sealant, UV-cured sealant, and/or double sided PSA tape.

As shown in FIG. 5, the dielectric layer 1018 and the anode layer 1014 can be disposed between at least an adjacent two of the plurality of cathode layers 1012A, 1012B. In one example, the dielectric layer 1018 and the anode layer 1014 can be located generally equidistant between said two adjacent cathode layers 1012A, 1012B such that the electrically conductive path between the anode layer 1014 and one of the cathode layers 1012A is generally equal to the electrically conductive path between the anode layer 1014 and other of the cathode layers 1012B. Still, the anode layer 1014 could be disposed between an adjacent two of the plurality of cathode layers 1012A, 1012B in a non-equal fashion, such that the anode layer 1014 is closer to one of the cathode layers 1012A, 1012B. In other examples, the anode layer 1014 can be located between a pair of adjacent cathode layers 1012A, 1012B, and spaced a distance from a additional other cathode layers (not shown). In still yet other examples, a plurality of anode layers (not shown) can be provided and arranged variously between or near a plurality of cathode layers.

After the anode layer 1014 is in place a "picture frame" 1020 can be placed around an area that will eventually bound the electrodes. As described herein, the cathode layers 1012A, 1012B can be printed after the picture frame 1020 is provided if the picture frame is a printed, but before if the picture frame is a die cut polymer laminate. The picture frame 1020 can generally be a spacer provided along the periphery of the HD electrochemical cell 1000, as viewed from the top. The picture frame 1020 can comprise a die cut polymer laminate sheet, such as a polyester or polyvinyl chloride (PVC) etc, and can be further provided with two layers of pressure sensitive adhesive (i.e., 1022 on the top surface and 1024 on the bottom surface). The top pressure sensitive adhesive (PSA) layer 1022 can be used to seal the top laminate substrate 1004 to the picture frame 1020, and bottom PSA layer 1024 can be used to seal the bottom laminate substrate 1002 to the picture frame 1020.

The picture frame assembly can have a total thickness (excluding the thickness of the PSA release liners) of about 0.015" (about 0.005"-0.50"). The picture frame can be placed on the lower laminate substrate 1002 after removing a bottom release liner so that the electrodes are centered within the frame. In some cases, to ensure a leak-free construction, a sealing and/or caulking adhesive, a heat sensitive sealant, and/or double sided PSA tape (not shown) can be placed and/or printed on any of the dielectric layer 1018, the anode 1014, and/or cathode collector layer 1016 in an area that falls generally under the picture frame 1020. The sealing adhesive (not shown) can also be provided underneath the remainder of the picture frame 1020. The total thickness of the HD cell 1000 can be generally uniform, or can vary depending upon the relative thicknesses of the various elements contained therein. If PVC is used as the spacer material, then it could be heat sealed without the use of the PSA layers on one or both sides.

If the electrolyte is not part of the gelled coating on top of the anode and/or cathode, a cell electrolyte 1026 can be provided to an absorbent material such as paper a paper separator 1028 or another type of soak-up material that covers or partially covers both electrodes. The electrolyte can be an aqueous solution of $ZnCl_2$ at weight percent of about 27% (about 23%-43%) that could also contain a thickener, such as carboxymethylcellulose (CMC) or other similar materials at about 0.6% level (about 0.1%-2%). Alternatively, a "starch ink" or the electrolyte could be flowed or printed over the anode and cathode that are inside the picture frame. The HD cell 1000 is completed by applying and sealing the top laminate 1004 over the picture frame 1020 using the PSA and/or with a heat seal.

Generally, one of the high current thin electrochemical cells described herein can provide about 1.5 volts. However, a number of cells can be electrically coupled together if higher voltages and/or high capacities are desired. For example, a 3 volt battery is obtained by connecting two 1.5 volt unit cells in series, although other voltages and/or currents can be obtained by using unit cells with different voltages and/or by combining different numbers of cells together either in series and/or in parallel. Thus, applications using greater voltages can connect unit cells in series, whereas applications requiring greater currents and/or capacities, unit cells can be connected in parallel, and applications using both can utilize various groups of cells connected in series further connected in parallel. Thus, a variety of applications that use different voltages and currents can be supported using a variety of unit cell and/or battery configuration.

Figure 7:
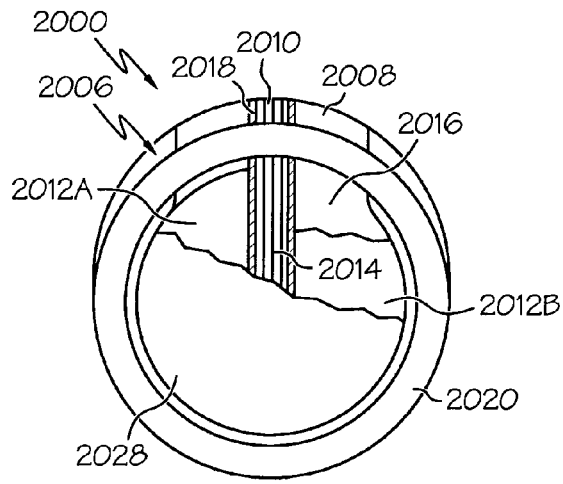
FIG. 7 illustrates a top, partial detail view of another example high current thin electrochemical cell.

Additionally, the HD design cell (2000) of FIG. 7 can be constructed using non-rectilinear geometries such as circular, elliptical, triangular, square, rectangular, other polygonal shape, random, etc., as may be required for some unique applications such as medical applications. In one example, a generally circular shape such as that shown in FIG. 7 can be made more easily, and may provide a better utilization of the area inside of the picture frame between the anode and the cathodes. To provide greater clarity, HD cell 2000 in FIG. 7 is shown without the top laminate. As can be understood, the relatively increased performance characteristics of the HD cell can be achieved with various geometries by placing the anode 2010 on top of dielectric (2018) and generally between two adjacent cathodes 2012A, 2012B. Similar reference numbers in the 2000 series (i.e., 2000, 2002, etc.) are used to indicate elements that are similar to, such as identical to, elements in FIG. 5. Still, more or less various other elements can also be used. In the prior art standard construction, cells using a non-rectilinear design and including a continuous anode strip often made for less efficient use of the anode strip and required more seal area over the anode strip. Because this area can be difficult to seal, the prior art standard construction has a greater chance for seal failure and poor electrical performance.

Additional detail of the various elements will now be described. The first and/or second substrates 1002, 1004 can include various layers, such as five layers. For example, the various layers of first substrate 1002 can include three plies of film, and two layers of a UV cured urethane laminating adhesive which can be relatively thin, such as about 0.2 mils thick, with a range of about 0.1-0.5 mils. In one example, this laminated structure can be supplied by Curwood Inc., a Bemis Corporation Company of Oshkosh, Wis. The top film layer can be a heat sealable layer, such as provided by DuPont (OL series), which is on the inside of the cell and can have an example thickness of about 0.00048" thick (e.g., about 0.0002"-0.002"). The middle film layer can be a high moisture barrier polymer layer such as the GL films supplied by Toppan of Japan. Typically, this polyester film can have an oxide or metalized coating on the inside of the laminated structure. This coating could have varying moisture transmission values depending on the type and the amount of vacuum deposited oxides, or metals. The third film layer which can be on the outside of the completed cell can be a polyester layer that can act as a structural layer. This structural layer of the five ply layer structure can be orientated polyester (OPET) and have a thickness of about 0.002" (e.g., about 0.0005"-0.010"), which can also be laminated to the other layers by means of a urethane adhesive that is about 0.2 mil thick, for example. This "structural layer" can be a DuPont polyester orientated (OPET) film such as their Melinex brand, for example. Another material that can be used is from Toyobo Co. Ltd. of Japan, which is polyester based synthetic paper, which is designated as white micro-voided orientated polyester (WMVOPET).

Depending on the cell construction, the cell application, and/or the cell environment, it may be advantageous to have different barrier properties for the substrate. Due to the wide range of available vapor transmission rates available, the barrier layer can be chosen for each specific application and construction, as desired. In some cases, for example where the cell by design has a higher gassing rate and a short life cycle, it may be appropriate and desirable to use a film with a higher transmission rate to allow for a larger amount of gas to escape, so as to minimize cell bulging. Another example would be an application that is in a hot dry environment such as a desert or some special industrial application. In such cases, it may be desirable to have a barrier film with low transmission rates to prevent excessive moisture loss from the batteries.

The use of a thicker substrate, by increasing any or all of the polymer thicknesses, may have some advantages: These may include one or both of the following:

The cells process better on printing press due to the thicker substrate being less temperature sensitive; and The cell package is stiffer and stronger.

In addition to the above specifications, both the outside and the inside layers could include the addition of a print-receptive surface for the inks. The inside layer is used for the functional inks (such as the collector and/or electrochemical layers) while the outside layer can be used for graphical inks, if desired. Flat cell constructions having a sealed system might utilize a laminated structure that includes metalized films and/or a very thin metal foil or foils as a moisture barrier. Although such structures using a metal layer might have better moisture barrier properties than the constructions used for some of the above described embodiments, it might also have some disadvantages. These may include one or more of the following:

Laminated structures with metal barriers (thin metal foil or a vacuum metalized layer) are likely more expensive;

Laminated structures with metal layers have the possibility of causing internal shorts; and Laminated structures that include a metal barrier could interfere with the electronics of an application, such as the functionality of a RFID antenna, for example.

The various substrates described herein can be comprised of numerous variations of polymeric film, with or without a barrier layer (including metal or other materials), and can utilize either mono-layer or multi-layer films, such as polyesters or polyolefin. Polyester is a good material to utilize because it provides improved strength at the high temperature drying conditions, thus permitting use of a thinner gauge film and is typically not easily stretched when used on a multi-station printing press. Vinyl, cellophane, and even paper can also be used as the film layers or as one or more of the layers in the laminated constructions. If a very long shelf life is desired, and/or the environmental conditions are extreme, the multi-ply laminates could be modified to include a metalized layer such as obtained by vacuum deposition of aluminum in place of the oxide coating.

Alternately, a very thin aluminum foil could be laminated within the structure of the film layer, or even in a different position. Such a modification could reduce already low water loss to practically nil. On the other hand, if the application is for a relatively short shelf life and/or a short operating life, a more expensive barrier layer could be replaced with a less efficient one that would be of a lower cost and still allow the cell to function for the desired lifetime.

In applications where only an extremely short life is desired, the cell package could instead use a film layer of a low cost polymer substrate such as polyester or polyolefin. It is possible that the pressure sensitive adhesives for coupling and/or sealing the various substrates together could be replaced with a heat sealing system on the laminates. For example, a heat sealing coating or the like could be used, such as amorphous polyester (APET or PETG), semi crystalline polyester (CPET), polyvinyl chloride (PVC), or a polyolefin polymer etc. on polymer film such as polyester. One such example material is the Ovenable Lidding (OL) films made by Dupont and designated as their OL series such as OL, OL2 or OL13.

Various other substrates can be utilized as a spacer frame. For example, the third substrate can be composed of various materials, such as PVC or PET film at about 0.0005"-0.030" thick and preferably at about 0-0.005"-0.015" that is sandwiched between (i.e., interposed between) two layers of a pressure sensitive adhesive (PSA) that is about 0.003" thick (0.001"-0.005") and includes a release liner. Additionally the spacer could be printed with a cured dielectric or some other curing and/or drying method. This material, such as Acheson Colloid's PM030, can also be a pressure sensitive adhesive, thus possibly eliminating the need to print an extra layer of adhesive.

The anode 1014 assembly can include various materials, such as zinc foil at about 0.0015"-0.005" thick and preferably at about 0.002" that is laminated to a pressure sensitive adhesive (PSA) 1019 that is about 0.002" thick (0.001"-0.005") and includes release liner. The PSA layer 1019 would be disposed between the anode 1014 and the dielectric 1018.

Thus, as shown in FIGS. 5-6, the HD design electrochemical cell 1000 provides a generally central anode 1014 that is separated from a cathode collector 1016 by at least an insulator 1018, and also possibly by the PSA layer 1019. On each side of the anode 1014 is provided a cathode 1012A, 1012B, both of which rest on the cathode collector 1016. The HD electrochemical cell 1000 is capable of producing a higher current due to its lower cell resistance as compared to the original construction. This is achieved by reducing the conductive length between the central anode 1014 and the two adjacent cathodes 1012A, 1012B, and/or reducing the resistance of the cathode collector 1016. As will be appreciated, generally symmetrical cell geometries can be beneficial for placing the anode 1014 generally between two adjacent cathodes 1012A, 1012B to thereby reduce the distance therebetween, though various types of cell geometries can be utilized.

For an electric current flowing across a surface, the ratio of DC voltage drop per unit length to the surface current per width. In effect, the surface resistivity is the resistance between two opposite sides of a square and is independent of the size of the square or its dimensional units. Surface resistivity, which is also known as "sheet resistance," is expressed in ohms per square. The sheet resistance is a measure of resistance of thin films that have a generally uniform thickness. Sheet resistance is applicable to two-dimensional systems where the thin film is considered to be a two dimensional entity. It is analogous to resistivity as used in three-dimensional systems. When the term sheet resistance is used, the current must be flowing along the plane of the sheet, and not perpendicular to it.

The conductive length is the distance that current has to travel between regions of the cathode and the anode. By essentially placing the anode 1014 in the middle of the cathodes 1012A, 1012B, relative to the prior art, the conductive length is substantially decreased, thus resulting in lower cell internal resistance. In addition, the currents can be higher because the resistance of the cathode collector 1016 is relatively lower. The resistance is lower because the number of squares is reduced. The resistance of the cathode collector 1016 from its bottom to its top, including the positive contact 1008, can be determined by calculating the number of squares in the cathode collector 1016. The number of squares is determined by dividing the collector length at its narrowest width by the narrowest width of the collector area. The number of squares using the HD design is about half of that present in a similarly sized cell using the standard construction. For example, the number of squares of the instant application can be generally equal to three or less. In another example, the number of squares of the instant application can be generally equal to one, or it at least approaches one, due to an example cathode collector 1016 shape being square, or generally approaching that of a square. Thus, for example, whereas the standard construction cell of a given size would generally exhibit a collector resistance of about 50-70 ohms, an HD cell of the same size using the new design would exhibit a reduced collector resistance of about 20-40 ohms.

To further explain the operation of the HD design, a sample calculation of resistance is provided. In the original design (see FIGS. 1-4) the cathode collector 131 is ~0.001" thick and is about 1.8" high and its narrowest width is 0.54", thus the number of squares is 1.8/0.54=3.3. Assuming that the carbon ink has a resistivity of ~20 ohms/square at one mil thick, then its theoretical resistance is about 66 ohms. In the HD design, the ~0.001" thick collector 1016 is 1.8" in length and its width is 1.2", thus the number squares equals 1.5 (i.e., 1.8/1.2=1.5). Multiplying these squares by the ink resistivity of ~20 ohms/square at one mil, the theoretical resistance is about 30 ohms. Thus, as can be appreciated, the theoretical resistance can be further reduced by increasing the width of the collector 1016 to be substantially equal to the length. For example, increasing the width of the collector 1016 from 1.2" to about 1.8" yields a number of squares generally equal to 1 (i.e., 1.8/1.8=1). Multiplying this square by the ink resistivity of ~20 ohms/square at one mil, the theoretical resistance would then be about 20 ohms.

In another example, such as where the cathode collector 1016 has a generally non-rectilinear geometry, the theoretical resistance can be similarly determined by dividing the collector length at its narrowest width by the narrowest width of the collector area. However, where a generally non-rectilinear geometry is used, the length and width can be determined by an effective length and an effective width, respectively. For example, the effective length or width can be an average length or width, or other mathematically adjusted length and width that can approximate the length and width measurements of a generally rectilinear geometry. Thus, the theoretical resistance of the non-rectilinear collector can be reduced by adjusting the effective length and effective width such that the number of squares is in one example generally equal to or less than three, or in another example, generally equal to one or approaching one.

Figure 8:
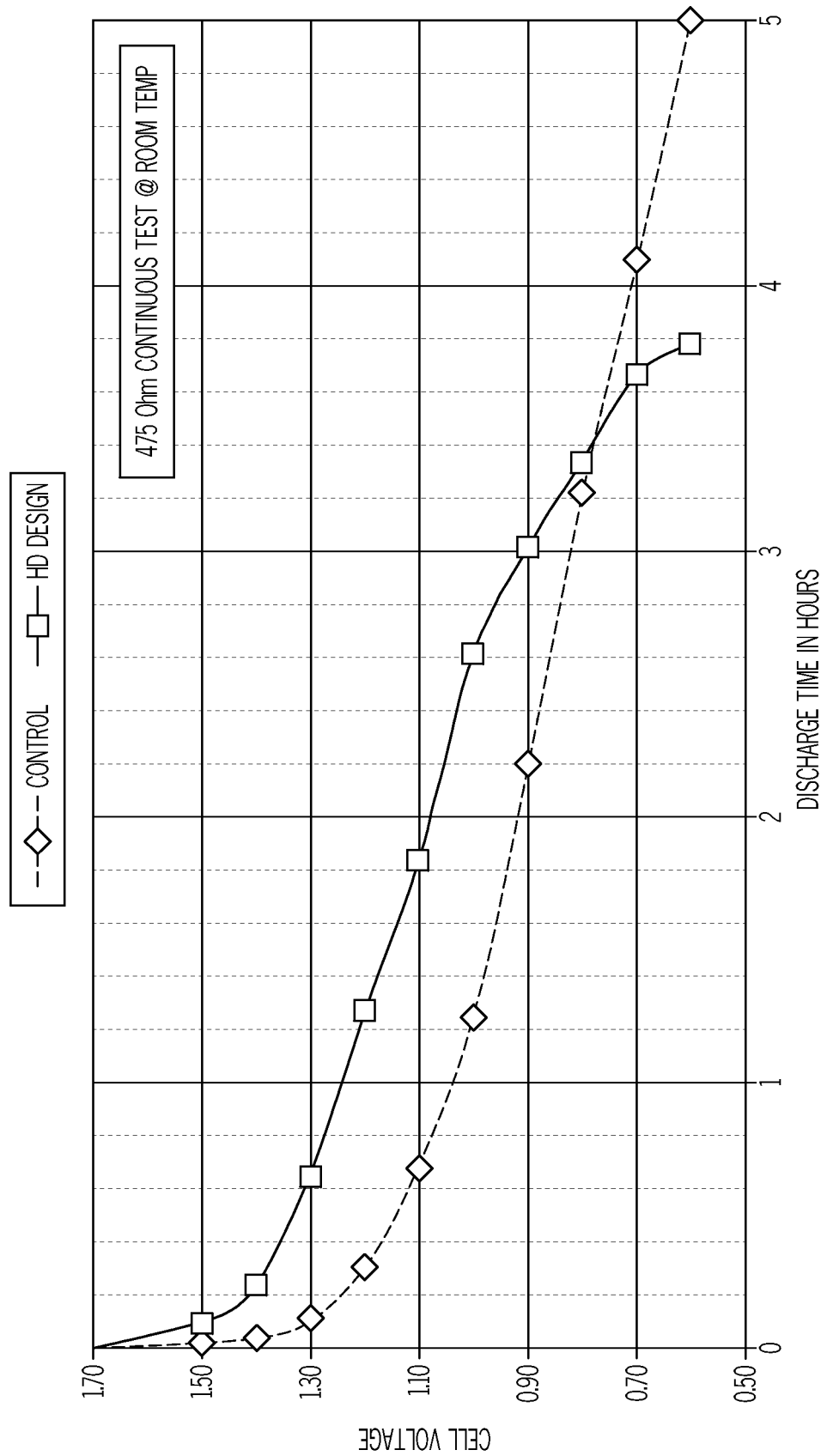
FIG. 8 illustrates an example continuous discharge curves relating cell voltage to discharge time for an example high current thin electrochemical cell and compared to a cell of the prior art.
Figure 9:
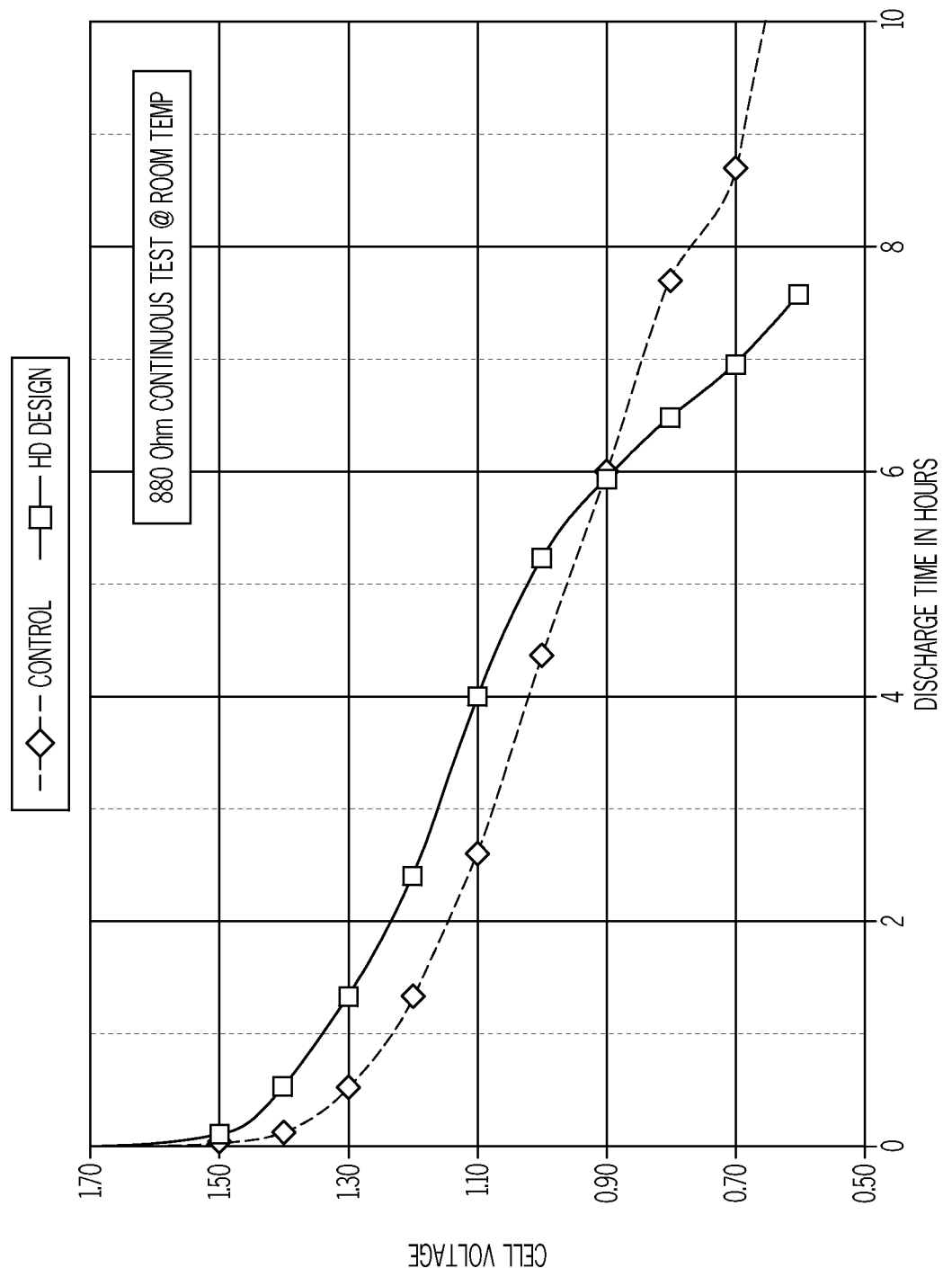
FIG. 9 is similar to FIG. 8, but the cells are discharged on a different load.
Figure 10:
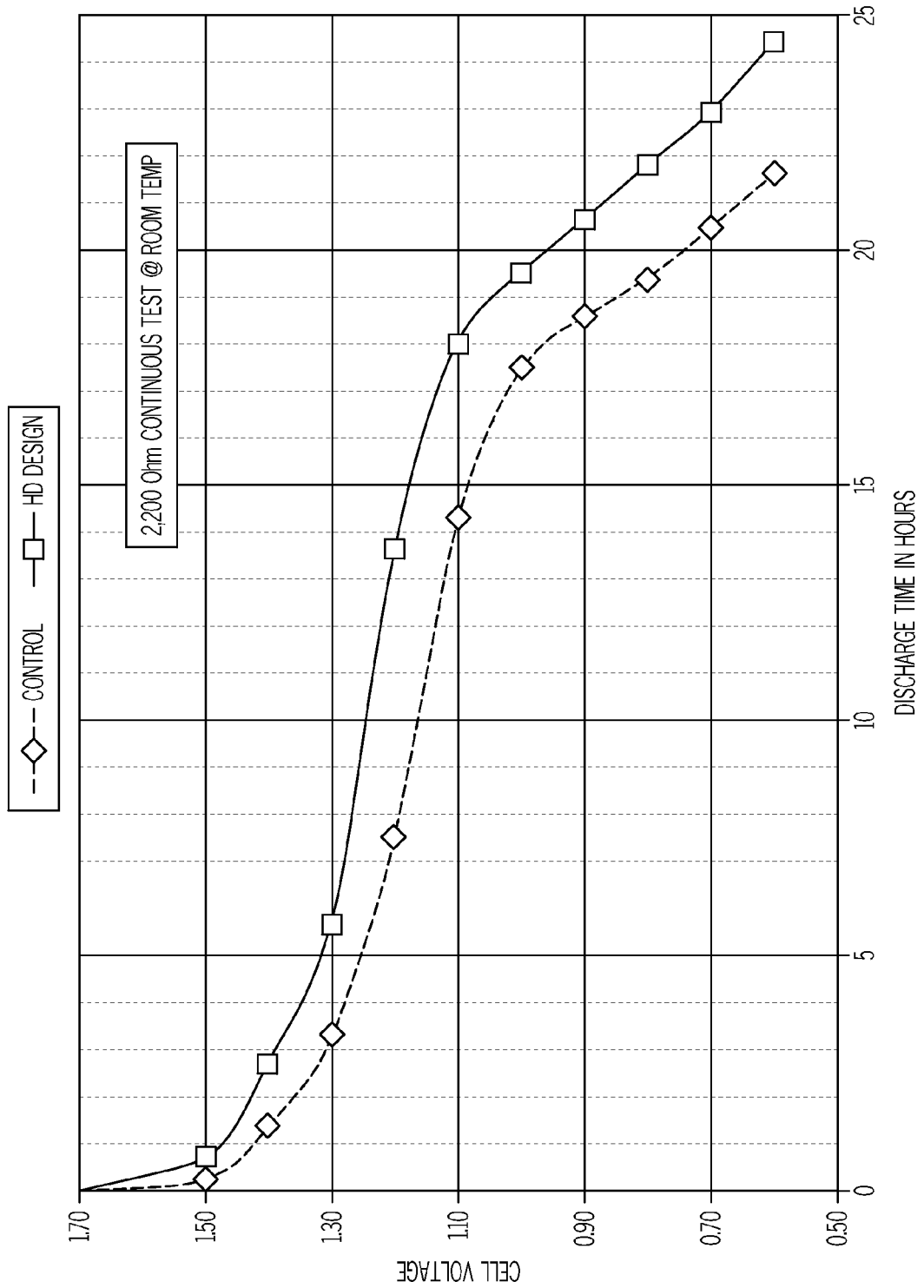
FIG. 10 is similar to FIG. 8, but the cells are discharged on another different load.
Figure 11:
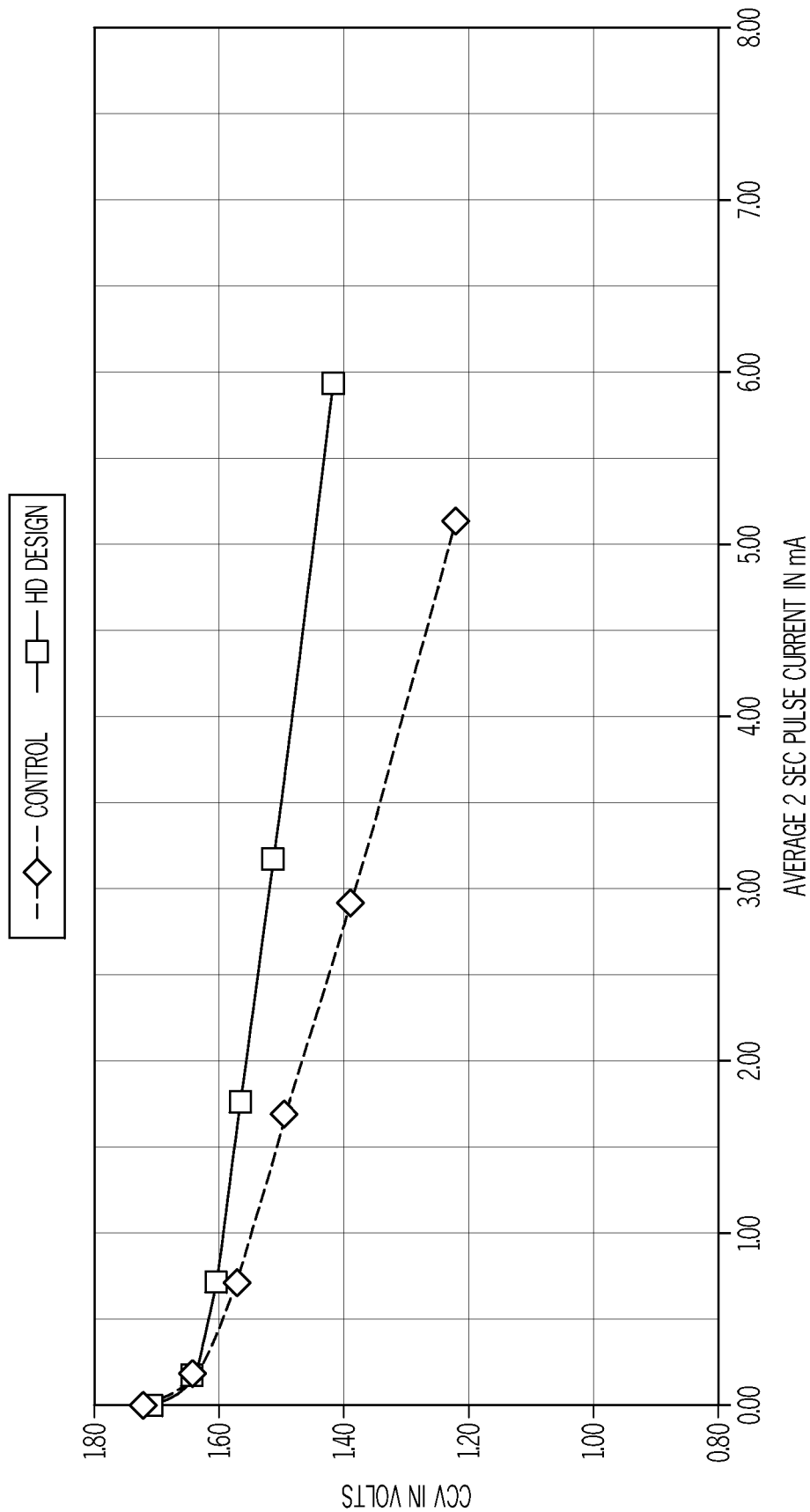
FIG. 11 shows closed circuit voltages (CCV) for a two second pulse with a plurality of currents in milliamps.

Turning now to FIGS. 8-11, four graphs are provided herein that further demonstrate the performance advantages of thin electrochemical cells using the HD design. Three graphs of FIGS. 8-10 show the average continuous discharge curves at room temperature based on the average of three cells per test of the prior art of thin electrochemical cell (i.e., "Control") as compared to the average of three cells per test with a thin electrochemical cell of the HD design (i.e., "HD Design"). Each graph illustrates the average continuous discharge for various example loads (i.e., 475 ohm, 880 ohm, and 2,200 ohm). As demonstrated by the graphs, the HD designs provide relatively higher initial closed circuit voltages (CCV) throughout the early part of the discharge curves that allows for more discharge time to the higher voltage cutoffs. This happens even though the standard co-planar cells can have about 15%-20% more capacity than the HD cells due their larger cathode area (i.e., see FIGS. 8-9). This advantage is greater for the HD construction as discharge current becomes higher. The fourth graph in FIG. 11 shows the average CCV of five cells per test (in volts on a two second long pulse) as compared to the average pulse current (in milliamps), and both demonstrates and confirms that the pulse voltage improvement is larger as the current becomes higher for the electrochemical cell of the HD design. It is to be understood that these graphs illustrate only example performances of the HD design, and that the HD design cells can have various other performance characteristics, values, etc.

The HD co-planar design has performance characteristics that can be better than that of the standard co-planar construction for high current applications. In addition, the HD design can provide performance approaching the performance levels of a co-facial construction, while its manufacturability can be similar to that of standard co-planar construction. Furthermore, it can be made using existing methods and equipment.

To make the manufacturing process of a cell/battery more efficient and/or achieve greater economies of scale, the cell/battery can be manufactured using a generally continuous web in a reel-to-reel printing process to provide production at high speeds and low cost. An example manufacturing procedure is illustrated in the flow diagram of FIG. 12 and is described in the following paragraphs. In this example procedure, the cell/battery proceeds through numerous stations that are compatible with a high-speed printing press running a roll-to-roll setup. Though not further described herein, the processing and assembly could be integrated with the manufacture of an electronic component (for example, one to be powered by the battery or cell).

According to available printing presses, the cells could be made with one pass, or multiple passes, on a given press, for example. The various drawings illustrate, as an example, two rows of individual cells on the web; however, the number of rows is limited only to the size of the unit cells and the maximum web width that the press can process. Because there may be numerous steps, thereby likely utilizing a long and complicated press, some of these steps, as well as some of the materials, could be modified and/or multiple passes of a press or multiple presses could be used. Some modified process summaries will be shown after the initial discussion is completed. Moreover, any or all of the printing steps can be performed by screen printing, such as by flat bed screens or even rotary screen stations. Additionally, one skilled in the art would realize that one printing press with more than ten stations could be difficult to find and or to operate, and thus the following discussion of the process could occur on one or more presses or even multiple passes through one press.

Figure 12:
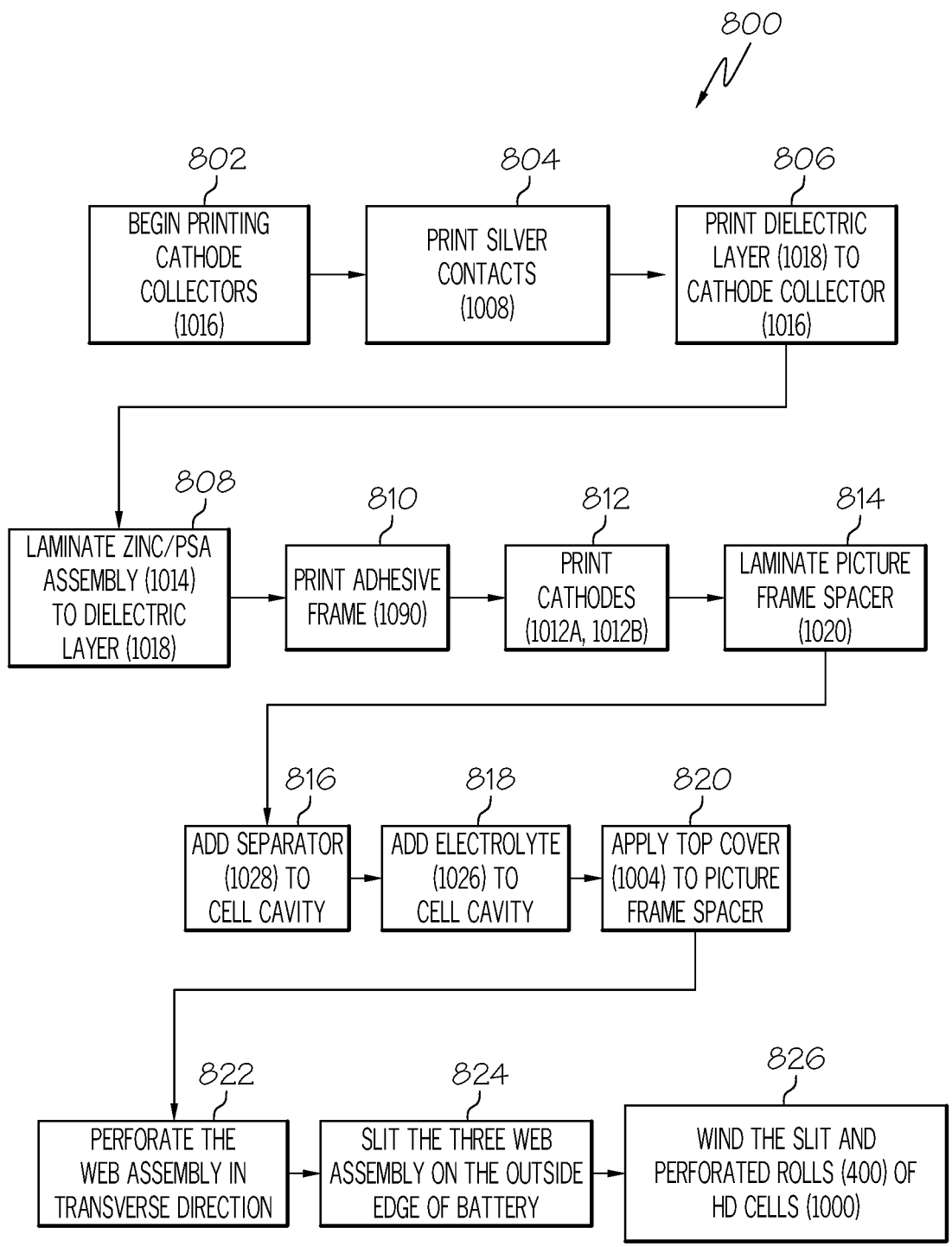
FIG. 12 illustrates a flow diagram of one example method of manufacturing the example high current thin electrochemical cell.

However, before the cell/battery is processed as shown in FIG. 12, various optional operations may or may not occur. For example, the optional operations could include one or both of heat stabilization of the web and graphics printing (which could include logos, contact polarities, printing codes and the addition of registration marks on the outside surface of web). If these optional printing operations occur on the web, then the web can be turned over and the functional inks can be printed on the inside surface, (i.e., the heat seal layer).

One skilled in the art would realize that there are many methods, materials, and sequences of operations that could be used, and that more or less, similar or different, numbers of stations could also be utilized. Still, it is to be understood that the following process 800 can also be utilized for the manufacture of various other integrated electronic devices. Further, for the purposes of clarity only two columns of batteries will be described and illustrated with the understanding that such description can similarly apply to other columns. Moreover, it is to be understood that any or all of the following elements can include any of the various materials, chemical compositions, etc. described throughout this document. Additionally, the various steps as shown in the process 800 of FIG. 12 are intended to be merely example steps, and it is to be understood that the steps can include various other steps, alternatives, etc. as discussed herein, any or all of which may differ from those example steps shown in FIG. 12.

Figure 13:
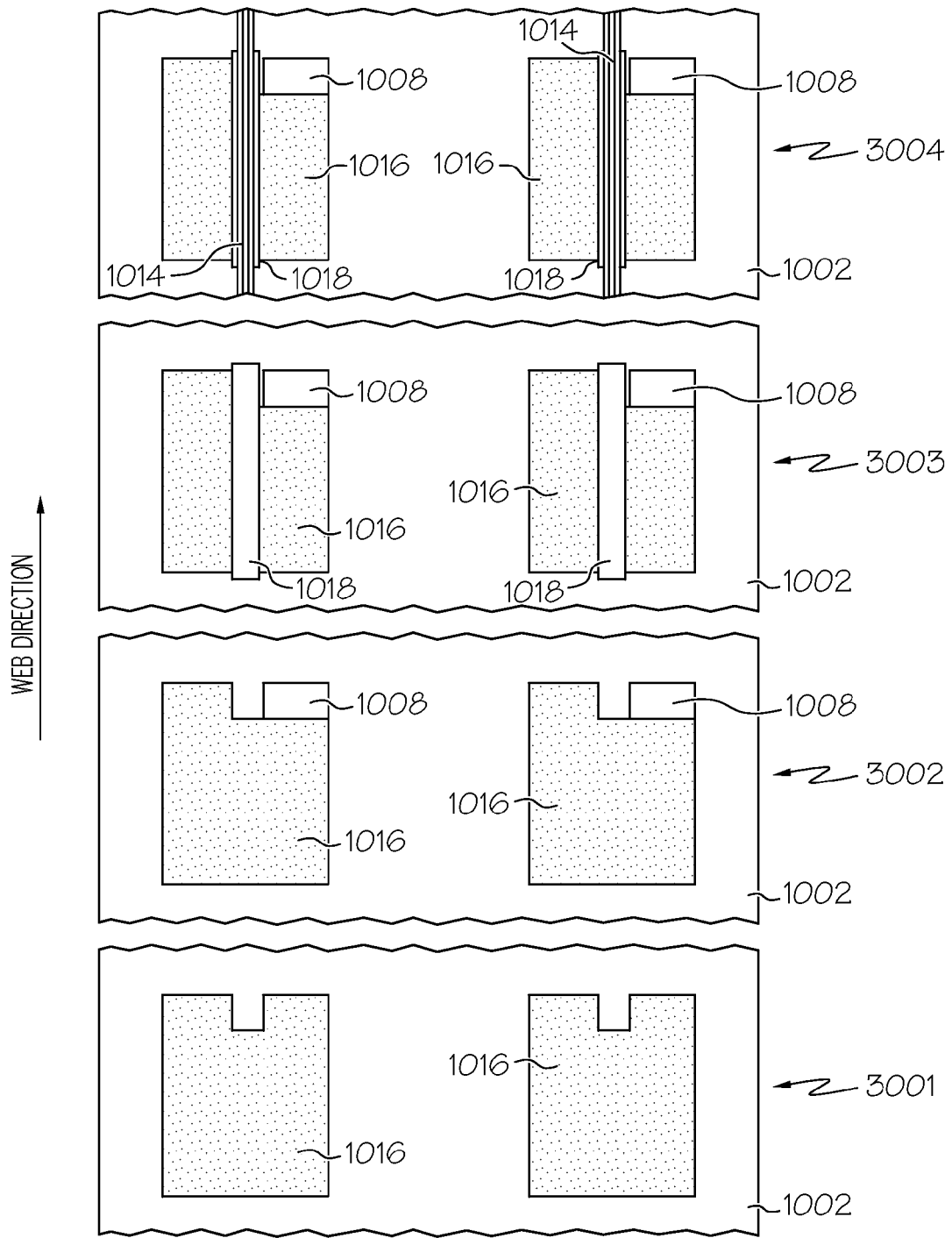
FIG. 13 illustrates a plurality of example steps of the method of FIG. 12.
Figure 14:
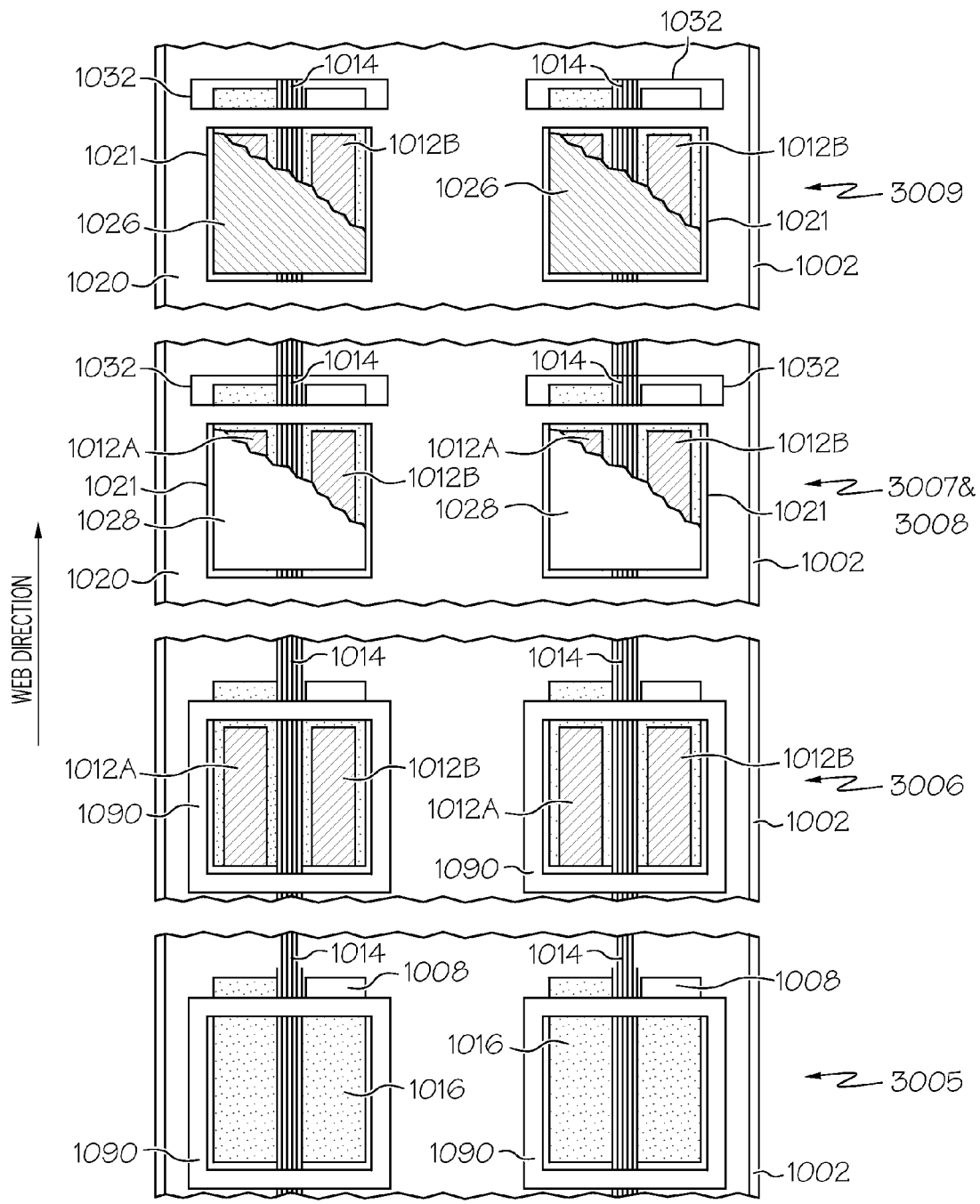
FIG. 14 illustrates another plurality of example steps of the method of FIG. 12.
Figure 15:
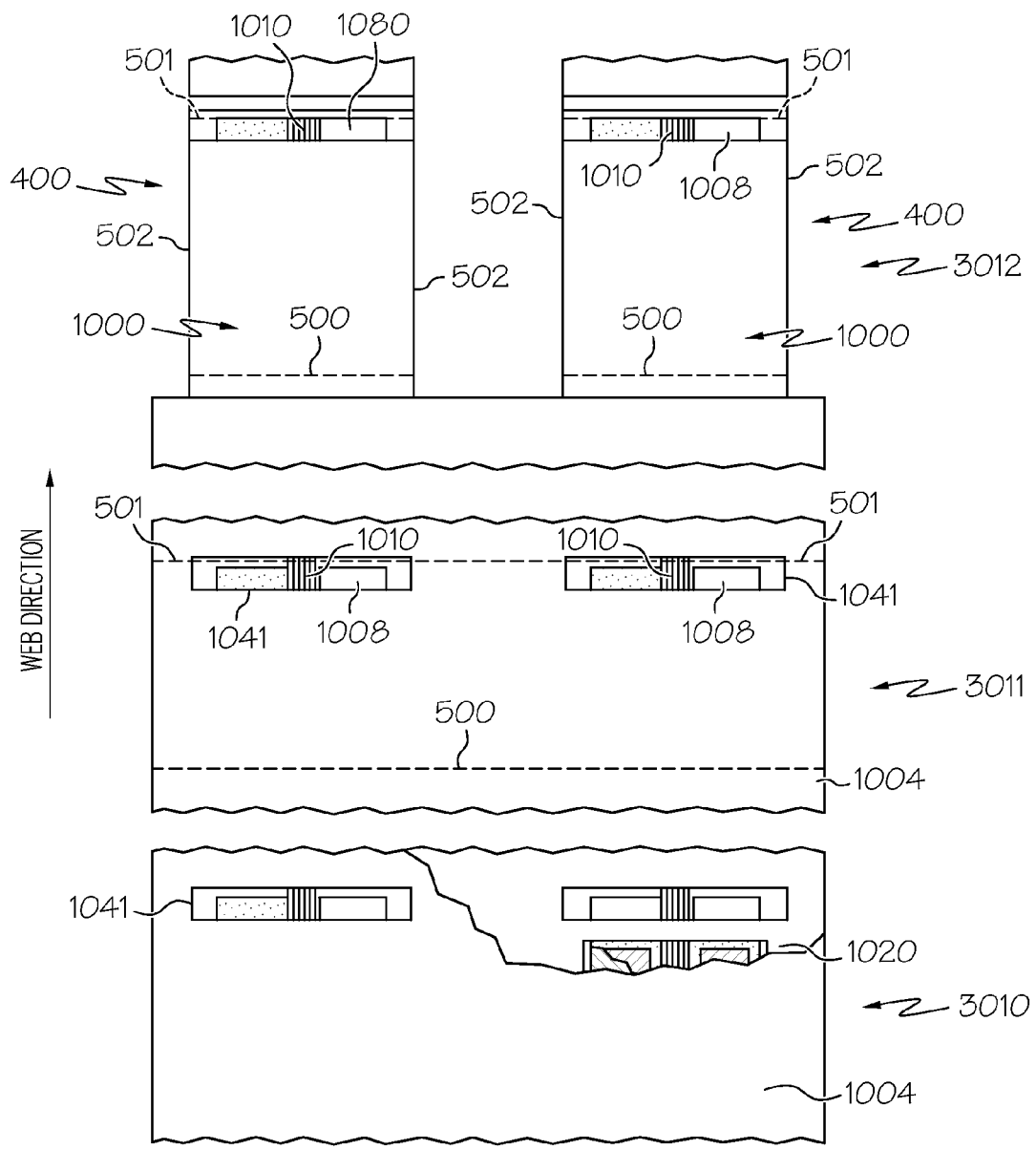
FIG. 15 illustrates yet another plurality of example steps of the method of FIG. 12.

As shown in FIG. 12, the integrated process 800 can begin with a heat stabilized first substrate 1002 upon which the cells/batteries can be constructed according to the following example process shown in FIGS. 13-15. The first substrate 1002 can be bare or may have a plurality of completed or partially completed electric components thereon. While the following steps will be discussed with reference to various "stations" that the first substrate 1002 encounters, it is to be understood that these "stations" may or may not involve discrete stations and/or steps, and that any or all of the "stations" and/or steps may be performed by one or more machines, and/or even manually. Moreover, any or all of the various "stations" and/or steps may be combined, and/or even performed simultaneously.

Turning to FIG. 13, the process 800 includes the first step 802 at the first print station 3001 where the cathode collector 1016 is printed onto the first side of the first substrate (heat seal surface) 1002 with a highly conductive carbon ink. The area in which the anode will eventually pass at the contact end may not be printed, as shown.

The cathode collector 1016 can include various materials, such as a highly conductive carbon ink (e.g., PM024) such as manufactured by Acheson Colloids of Port Huron, Mich. The cathode collector 1016 can be printed on the lower laminate 1002 by commercial means such as screen printing, for example using a very coarse screen of about 61 mesh (about 20-100 mesh for some embodiments) to allow for a dry deposit of about 1 mil (about 0.8-1.2 mils respectively). A cell with a size of about 2"×2" would thus have a resistance of about 20-40 ohms as discussed previously herein.

Next, in step 804 at the second station 3002, a silver battery contact 1008 can be printed on a portion of the cathode collector 1016. For example, the location of the contact 1008 can be positioned in an extended area 1006 on either or both sides of the negative contact 1010 (see FIG. 5) so as to be outside of the spacer 1020 when eventually provided at a later step. The battery silver positive contact 1008 may be utilized for high drain applications to electrically couple the completed HD cell 1000 to an electronic device to be powered. In addition, various other contacts (not shown) can also be provided onto the cathode collector 1016 to provide various other electrical connection points. The material used in this example construction is a silver filled conductive ink (SS479) manufactured by Acheson Colloids of Port Huron, Mich. which can be screen printed. Other useable conductive contact materials, such as gold, tin, copper, nickel and/or mixtures of two or more conductive materials, along with other materials, could also be used for acceptable embodiments. Any of these conductive inks might be applied by means of, for example, a printing method, such as rotary screen, flexography, and gravure, as well as with ink jet printing techniques, for example. Additionally, manufactured foils of graphite and/or mixtures including one or more of conductive resins, electrochemical compatible metals, and graphite could be inserted and used, instead of printing an ink cathode collector. In applications where only very low currents are used, a highly conductive positive contact may not be utilized, and/or if somewhat higher currents are desired, the carbon circuit contact might instead be used as the high conductivity contact.

Next, in step 806 at the third station 3003, a stripe of dielectric material 1018 is printed onto the first side of the first substrate 1002, upon the cathode collector 1016 where the anode layer 1014 will eventually cross thereover. To facilitate complete insulation of the anode 1014 from the cathode collector 1016, the dielectric material 1018 should extend beyond the collector 1016 on both ends. Though described as being printed, the dielectric layer 1018 can also be a laminated continuous strip with a suitable material. The insulating layer 1018 can include various dielectric or electrically-neutral materials, such as polyvinyl chloride, polyester, and/or various adhesives, such as heat sensitive sealant, UV-cured sealant, and/or double sided PSA tape.

Next, in step 808 at the fourth station 3004 shown in FIG. 13 a continuous strip of zinc foil/PSA laminate 1014 is laminated onto the dielectric layer 1018. Various materials can be used, such as an assembly comprised of the zinc foil at about 0.002" thick and PSA film at about 0.002" thick. A release liner can be removed just prior to laminating anode laminate 1014 to the dielectric layer 1018. Thus, the anode layer 1014 can be insulated from said cathode collector layer 1016 by said dielectric layer 1018, as well as by the PSA layer. Still, it is to be understood that the PSA layer may not be used. Alternately, the zinc anode could printed on the dielectric.

In an example embodiment of the battery shown in FIG. 5, a precut anode strip foil, which can be a laminate (and of possible dimensions of about: 1.75"×0.20"×0.002", for example), is inserted onto the lower substrate adjacent to the cathode collector/cathode assembly at a gap of about 0.050" (about 0.010"-0.100") from this assembly. Prior to insertion, the 2 mil thick battery grade zinc foil can be laminated to a dry film adhesive with a release liner, such as #2180, IB1190 or IB2130 manufactured by Morgan Adhesive Co. of Stow, Ohio. After this lamination is completed, for example on a wide roll of zinc (e.g., about 3-12' wide), this laminated structure can be slit into narrow rolls with a width of about 0.200" (about 0.170"-0.230") for an about 1 sq. inch cathode cell. Cells with other sizes of cathodes can utilize different slit widths for the anode laminate. In another construction, the lamination could be done with a printed adhesive on the dielectric prior to applying the zinc foil strip, for example. Still, in other examples, the anode can be provided by a printing process. For example, the anode can be printed about 0.20" wide and about 0.002" (about 0.0003-0.005") thick, though various other widths and thicknesses are contemplated. Moreover, to make the printed anode even more conductive, an anode collector (not shown) can be printed under the anode, such as in a conductive pattern or the like.

Next, at step 810 at the fifth station 3005, a frame sealant, which can be an adhesive, such as Acheson Colloid's PM040 can be printed around the perimeter of the cell in the shape of a "picture frame 1090." The frame sealant can be provided on top of the zinc anode 1014 and adjacent to or even over the cathode collector 1016 in the seal area. The frame sealant can generally bound an inner space that will define an interior volume of the battery cell.

Next, in step 812 at the sixth station 3006, the plurality of cathode layers 1012A, 1012B can be screen-printed over part of the cathode collector 1016. In an example embodiment, the cathode layers 1012A, 1012B can be printed on a portion of the previously printed and dried cathode collector layer 1016 with an aqueous based ink that has a wet composition, for example, of about 43.4% of battery grade Manganese Dioxide (about 20%-60%), about 14.4% of KS-6 graphite (about 2%-25%), about 29.5% of about 6.5% (about 0.5%-15%) aqueous solution of polyvinylpyrrolidone (PVP) (about 20%-60%); and about 9.65% of De-ionized or distilled water (about 0.1%-20%). Such an ink can be printed with about a 46 mesh (about 10-65 mesh) fiberglass screen so as to allow a nominal dry lay down weight of about 0.10 grams per square inch (about 0.03-0.25 g/sq. in.). The amount of dry print would typically be dictated by the desired cell capacity, using more material when a higher capacity is desired, for example. By using this unconventional printing method utilizing a very coarse mesh screen instead of multiple hits of a finer mesh screen, the number of printing stations can be reduced and the cell performance can be increased.

The cathode layer (1012A, 1012B) material used in this example construction includes, for example, an electrolytic manganese dioxide of high purity battery grade. The material particle size range for this embodiment is, for example, about 1 to 100 microns with an average size of about 40 microns. If additional fineness of the material is desired to facilitate the application to the collector, the material can be milled to achieve a particle size range of about 1 to 20 microns, with an average of about 4 microns, if desired. Other usable electroactive cathode materials that may be used in conjunction with the zinc anode in the subject construction, are silver oxides $Ag_2O$ and/or AgO, mercuric oxide HgO, nickel oxide NiOOH, oxygen $O_2$ (as in the form of an air cell, for example), and Vanadium oxide $VO_2$, for example. Cathodic materials that may be used with different anodic materials include one or more of NiOOH with Cd, NiOOH with metal hydrides of the $AB_2$ and the $AB_3$ types, and NiOOH with Fe and $FES_2$, for example.

A binder used in the cathode layer of an example embodiment includes a class of high molecular weight binders that exceed about 950,000-grams/mole. One such polymer that can be used is polyvinylpyrrolidone, about K 85-95 or about K 120 (higher molecular weight). Other classes of materials that can be used include one or more of the following: polyvinyl alcohol; classes of starches and modified starches, including rice, potato, corn, and bean varieties; ethyl and hydroxy-ethyl celluloses; methyl celluloses; polyethylene oxides; polyacryamides; as well as mixtures of these materials. Additional or alternative binding may be derived, if desired, from the use of Teflon solutions or Teflon fibrillated during the blending process, or even from hydroxy-ethyl cellulose (HEC) solutions, such as Dow QP100 MH.

Next, at step 814 at the seventh station 3007 the third substrate web 1020 which can be slightly narrower than substrate 1002, is laminated in registration over the first substrate 1002 to provide the frame to form the inner space cavity for the battery cell, as well as the openings for the cell contacts. The third substrate 1020 forms a "picture frame" placed around the electrodes that can generally be a spacer provided along the periphery of the HD electrochemical cell 1000 and the previously applied adhesive frame 1090. The third substrate web 1020 can be laminated over the first substrate 1020 with the picture frame cutout 1021 around the active ingredients of the cell and cutout 1032 for the cells contacts. An adhesive layer 1024 of the third substrate web 1020 can be applied onto the first side of the first substrate 1020 after a release liner (not shown) is removed. Further, though illustrated as a web, the third substrate 1020 can also be provided as discrete elements, such as discrete sheets or the like.

In addition or alternatively, the frame sealant could be an adhesive layer, such as a PSA layer or the like. It is to be understood that the third substrate web 1020 can be used together with, or independent of, the aforedescribed frame sealant. Thus, it is to be understood that either, or both, of the adhesive frame 1090 and/or the third substrate web 1020 can be used to form separate, or even the same, "picture frame" around the electrodes. Indeed, either or both of the adhesive frame 1090 and/or the third substrate web 1020 can form an intermediate spacer layer. Generally, the third substrate web 1020 can be utilized as the spacer as it is generally relatively thicker than the frame sealant.

Next, at step 816 at the eighth station 3008, a "paper separator" 1028 or another type of soak-up material can be inserted on top of the anode and the cathode. Alternatively, a "starch ink" or the electrolyte could be flowed or printed over the anode and cathode that are inside the picture frame. Although the seventh and eighth stations 3007, 3008 are shown at the same station in FIG. 14, it is to be understood that the steps 814 and 816 can be performed simultaneously or sequentially in various orders.

Next, at step 818 at the ninth station 3009, when a paper separator is used, an electrolyte, such as an aqueous ZnCl2 electrolyte 1026, is added to the top of the paper separator 1028 which was placed over the cathodes 1012A, 1012B and zinc anode 1014.

Remaining with step 818, an alternative ninth station (not shown) can provide an alternative electrolyte configuration when a paper separator is not used. For example, the electrolyte can be provided in the form of a viscous liquid (such as a flowable-gel) is added on the inside area of each unit cell. Due to its flow-ability, the electrolyte will generally spread out to uniformly cover the anode and cathode. A printed electrolyte (e.g., using an ink or flowable gel) could be substituted for the liquid electrolyte and paper separator of the above referenced application.

Turning now to FIG. 15 at step 820 at the tenth station 3010, the second substrate 1004 is added as a "top cover" to the top of the picture frame (i.e., the third substrate 1020). In this station, better clarity of the cells' construction, the spacer 1020 and top cover 1004 are shown with a partial cutaways so that all three webs can be seen at the same time. Before the top cover 1004 is applied, openings 1041 for the cells contacts can be die cut, thus, when laminating this layer it is done in registration to the printed cell/battery on substrate 1002 and with the spacer 1020 to allow the cells contacts to be visible and available for the circuit connection. This second substrate 1004 seals each cell. The seal of the second substrate 1004 can be provided by a layer of pressure sensitive adhesive (i.e., layer 1022) on the spacer web 1020 and/or a heat seal layer on the bottom side of second substrate 1004, such as a double-sided adhesive configuration previously discussed herein. The cells are completely sealed around their perimeter after pressure and/or heat is applied. This sealing forms the battery seal.

Next, at step 822 also at the eleventh station 3011, the completed laminated assembly consisting of webs 1002, 1020 and 1004 can be perforated in the transverse direction along a lines 500 the trailing edge of one battery and 501 the top edge of the battery contacts 1008, 1010. Either or both perforations can be performed using various methods, such as a rotary die or the like.

Next, at step 824 at the twelve station 3012, the three web assembly (1002, 1020, and 1004) is slit 502 on the two outside edges of each cell thus forming rolls 400 of completed HD batteries 1000. It is to be understood that the number of rolls 400 can vary depending on various factors, such as on the web width and the width of each device, etc. Due the perforations done in step 3011, cells of the proper size can be easily removed for the roll when they are attached to their respective circuits.

Next, at the final step 826 (which can be a twelfth station, not shown), the completed HD batteries 1000 can be rolled onto a roll 400 for storage, transport, etc. Still, the HD batteries 1000 can be stored in various other manners. Another option available (not shown) to the end user of HD cells 1000 is to have cells die cut from the roll of completed cells from station 3010, and packed for assembly such as in the much used magazine format.

Figure 16:
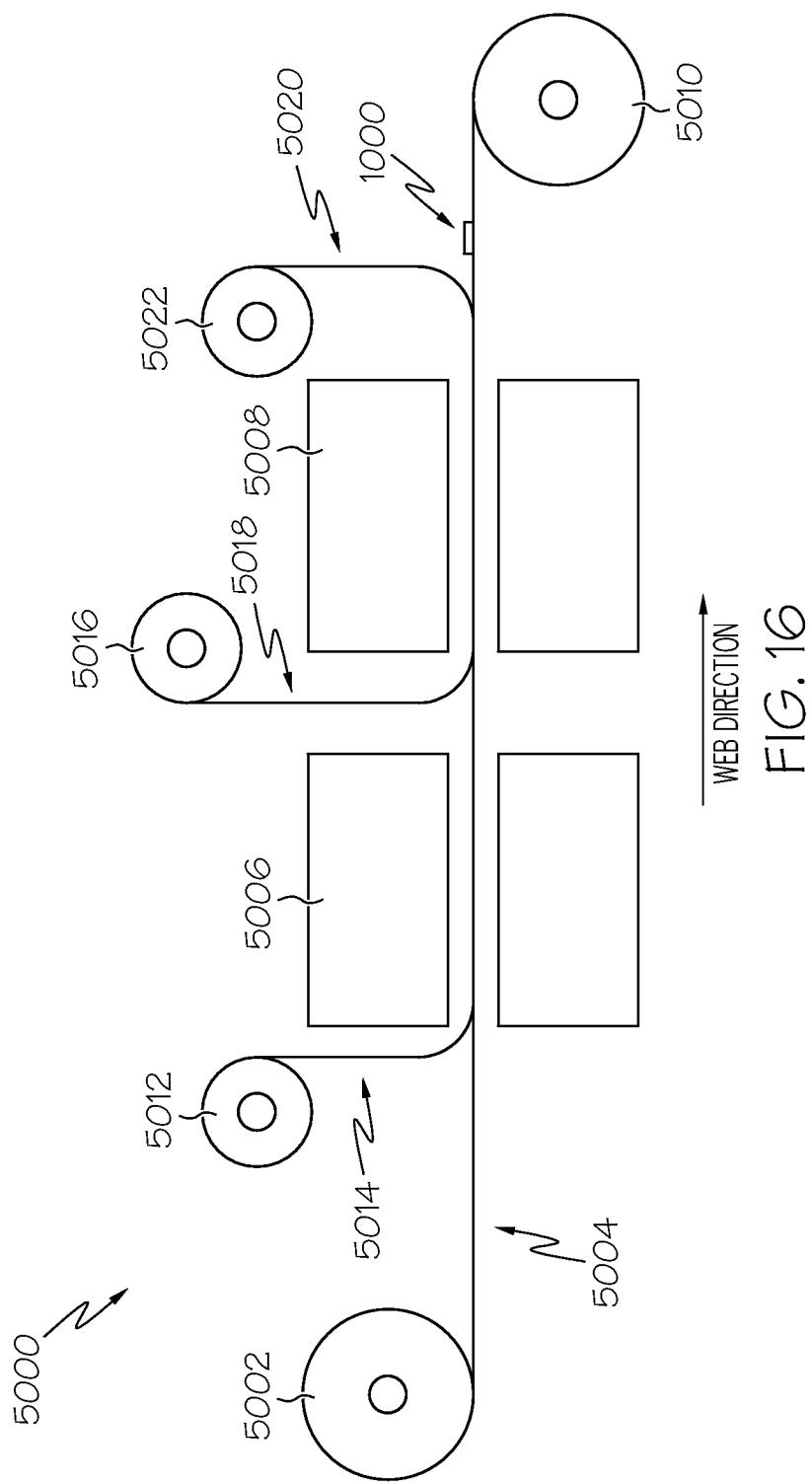
FIG. 16 illustrates a schematic view of an example manufacturing process utilizing a generally continuous web.

Turning now to FIG. 16, a schematic view of an example manufacturing process 5000 of the various steps shown in FIGS. 12-15, is illustrated utilizing a generally continuous web 5004. As discussed herein, any or all of the substrates 1002, 1004, 1020 can be provided as generally continuous webs that can be processed through a "reel-to-reel" style manufacturing process. For example, the first substrate 1002 can be provided as a generally continuous web 5004 from a source station 5002, which can be a source roll or the like. Some or all of the various processing steps, such as, for example, the steps of providing said cathode layer, providing said anode layer, etc., can then be performed by passing the generally continuous web 5004 through a printing station 5008. Though only a single printing station 5008 is illustrated, it is to be understood that multiple printing stations can be utilized. In addition or alternatively, though not illustrated, the process 5000 can be adapted to pass the web 5004 through the printing station 5008 in multiple passes. Finally, the completed HD batteries 1000 on the generally continuous web 5004 can be collected at a take-up station 5010, which can include a collection roll, such as the roll 400 previously described herein.

The manufacturing process 5000 can include various other stages, steps, etc. For example, prior to the printing station 5008, the web 5004 can pass through an auxiliary station 5006 wherein various electronic components be provided. Moreover, any or all of the various layers, substrates, etc. can be provided by supplemental rolls along the process. For example, the third substrate 1020 (i.e., spacer layer) can be provided by a first supplemental roll 5012 via a supplemental web 5014. In another example, the third substrate 1020 can similarly be provided by a second supplemental roll 5016 via another supplemental web 5018. Though illustrated near the beginning of the printing station 5008, it is to be understood that any or all of the supplemental webs 5014, 5018 can be provided at various locations along the manufacturing process 5000. In addition or alternatively, waste material, such as release layers or the like, can be removed from as a waste web 5020 and taken-up by a waste roll 5022 or the like. Various other pre-processing and/or post-processing stations, steps, etc. can also be included. It is to be understood that the various stations, rolls, etc. of the described process 5000 can be utilized in various orders, and additional equipment may even be provided (e.g., idler rollers, tension rollers, turn-bars, slit or perforators, etc.) to facilitate the "reel-to-reel" process.

Various other additional steps (not shown) can be utilized to provide additional structure, features, etc. to the completed HD battery cells 1000. In one example, an outer portion of the device 1000, such as the second substrate 1004 "top cover", can be provided with a method of attaching the HD battery cells 1000 to another object, surface, etc. For example, the second substrate 1004 can include a pressure sensitive adhesive, another adhesive layer, a hook-and-loop style fastener, a liquid or hot-melt adhesive, etc. In another example, an outer portion of the HD battery cells 1000 1000, such as the second substrate 1004 "top cover", can be provided with printed indicia or even a label or the like.

Thin printed flexible batteries can have many potential applications, which can include one or more of the following generally categories as examples:
1. RFID assemblies
2. Advertising and promotion;
3. Toys, novelties, books, greeting cards, and games;
4. Inventory tracking and control such as (smart RFID tags);
5. Security tags;
6. Condition indicators such as temperature, humidity, etc.;
7. Skin patches that apply iontophoresis or other electrical function for the purpose of drug delivery, wound care, pain management and/or cosmetics; and
8. Healthcare products such as smart diapers, incontinence products, etc.

The invention has been described hereinabove using specific examples and embodiments; however, it will be understood by those skilled in the art that various alternatives may be used and equivalents may be substituted for elements and/or steps described herein, without deviating from the scope of the invention. Modifications may be performed to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A flexible battery including at least one electrochemical cell for generating an electrical current, said battery including:
   a first substrate;
   a second substrate;
   a cathode collector layer provided on said first substrate;
   a plurality of cathode layers provided on said cathode collector layer;
   an electrically-neutral dielectric layer provided on said cathode collector layer between at least an adjacent two of the plurality of cathode layers;
   an anode layer provided on said dielectric layer, said anode layer being electrically insulated from said cathode collector layer by said dielectric layer;
   an electrolyte layer comprising a liquid electrolyte in contact with said plurality of cathode layers and said anode layer; and
   wherein said first substrate is connected and sealed to said second substrate to form an inner space containing said electrolyte, and also containing at least a major portion of said plurality of cathode layers and at least a major portion of said anode layer within said inner space.

2. The battery of claim 1, wherein the dielectric layer is located equidistant between said two adjacent cathode layers.

3. The battery of claim 2, wherein the anode layer is located equidistant between said two adjacent cathode layers.

4. The battery of claim 1, wherein the cathode collector layer includes a geometry having a length and a width such that the number of squares is generally 3 or less, wherein the number of squares is determined by dividing the cathode collector length by the cathode collector width.

5. The battery of claim 4, wherein the length and width of the cathode collector geometry is such that the number of squares is generally 1, or approaching 1.

6. The battery of claim 1, wherein only one of said plurality of cathode layers and said anode layer is comprised of a dried or cured ink, and wherein the other of said plurality of cathode layers and said anode layer is comprised of a strip of material.

7. The battery of claim 1, further including a frame interposed between said first and second substrate to connect and seal said first substrate to said second substrate to form the inner space.

8. The battery of claim 1, wherein said anode layer comprises dried or cured ink.

9. The battery of claim 8, wherein said anode layer comprises printed zinc.

10. The battery of claim 1, wherein said cathode layers and said anode layer all comprise dried or cured ink.

11. The battery of claim 1, wherein said anode layer comprises a zinc foil applied over said cathode current collector via a pressure sensitive adhesive.

12. The battery of claim 1, wherein said plurality of cathode layers are disposed in a co-planar arrangement.

13. The battery of claim 1, wherein said dielectric layer is provided on said cathode collector layer between and co-planar with said adjacent two cathode layers.

14. The battery of claim 1, wherein the cathode collector layer includes a non-rectilinear geometry having an effective length and an effective width such that the number of squares is generally 3 or less, wherein the number of squares is determined by dividing said effective length by the said effective width.

* * * * *

UNITED STATES PATENT AND TRADEMARK OFFICE
CERTIFICATE OF CORRECTION

PATENT NO. : 8,574,754 B2  Page 1 of 1
APPLICATION NO. : 12/809844
DATED : November 5, 2013
INVENTOR(S) : Gary R. Tucholski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Twenty-second Day of September, 2015

Michelle K. Lee
*Director of the United States Patent and Trademark Office*